(12) United States Patent
Chayen et al.

(10) Patent No.: US 12,514,611 B2
(45) Date of Patent: Jan. 6, 2026

(54) DEVICES, SYSTEMS, AND METHODS FOR INTRALUMINAL PUNCTURING

(71) Applicant: REVASCARDIO LTD., Raanana (IL)

(72) Inventors: David Shlomo Chayen, Raanana (IL); Dotan Asher Chayen, Raanana (IL); Shahaf Marmor, Raanana (IL); Chaim Zeev Aber, Raanana (IL); Oded Meiri, Raanana (IL)

(73) Assignee: REVASCARDIO LTD., Raanana (IL)

( * ) Notice: Subject to any disclaimer, the term of this patent is extended or adjusted under 35 U.S.C. 154(b) by 0 days.

(21) Appl. No.: 19/213,354

(22) Filed: May 20, 2025

(65) Prior Publication Data

US 2025/0281201 A1    Sep. 11, 2025

Related U.S. Application Data

(63) Continuation of application No. PCT/IB2023/061707, filed on Nov. 20, 2023.

(60) Provisional application No. 63/384,517, filed on Nov. 21, 2022.

(51) Int. Cl.
*A61B 17/34* (2006.01)
*A61B 17/00* (2006.01)

(52) U.S. Cl.
CPC .... *A61B 17/3417* (2013.01); *A61B 17/00234* (2013.01); *A61B 2017/00238* (2013.01); *A61B 2017/00305* (2013.01); *A61B 2017/00367* (2013.01)

(58) Field of Classification Search
CPC ...... A61B 17/3478; A61B 2017/00247; A61B 2017/003; A61B 2017/22071; A61F 2/2427
See application file for complete search history.

(56) References Cited

U.S. PATENT DOCUMENTS

| 2002/0156495 | A1 | 10/2002 | Brenneman et al. |
| 2012/0041375 | A1 | 2/2012 | Magana |
| 2014/0309675 | A1* | 10/2014 | Maisano ............ A61B 17/3478 606/170 |

(Continued)

OTHER PUBLICATIONS

PCT International Search Report and Written Opinion mailed Feb. 29, 2024, issued for International Application No. PCT/IB2023/061707 (12 pgs.).

Primary Examiner — Mohamed G Gabr
(74) Attorney, Agent, or Firm — Finnegan, Henderson, Farabow, Garrett & Dunner LLP

(57) ABSTRACT

Devices, systems, and methods for intraluminal puncturing system are disclosed. A first catheter has a flexible positioning arm extending from a distal end thereof and being configured for delivery within an anatomical vessel. The flexible positioning arm is configured to transition between a collapsed orientation and an expanded orientation. A second catheter is disposed within the first catheter and has an opened distal end affixed to the positioning arm such that when the flexible positioning arm is in the expanded orientation, the opened distal end opposes a wall of the anatomical vessel. An elongated shaft is extendable through the second catheter. A tissue puncturer is located on a distal end of the elongated shaft. The tissue puncturer is configured for axial advancement in the second catheter and operably connected to the opened distal end of the second catheter.

19 Claims, 10 Drawing Sheets

(56) References Cited

U.S. PATENT DOCUMENTS

| | | |
|---|---|---|
| 2020/0229805 A1 | 7/2020 | Gammie et al. |
| 2020/0246046 A1* | 8/2020 | Gammie ............ A61B 17/3478 |
| 2020/0297416 A1 | 9/2020 | Berguer et al. |
| 2021/0259738 A1 | 8/2021 | Gammie et al. |

* cited by examiner

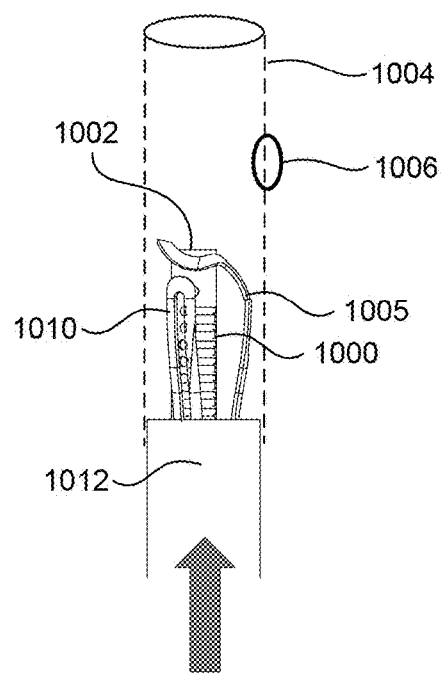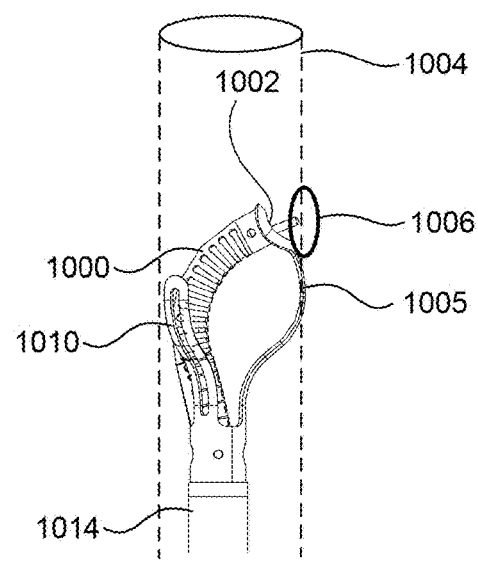
FIG. 10A  FIG. 10B
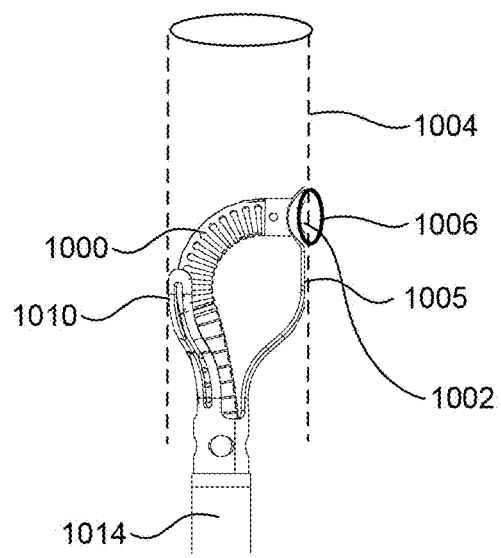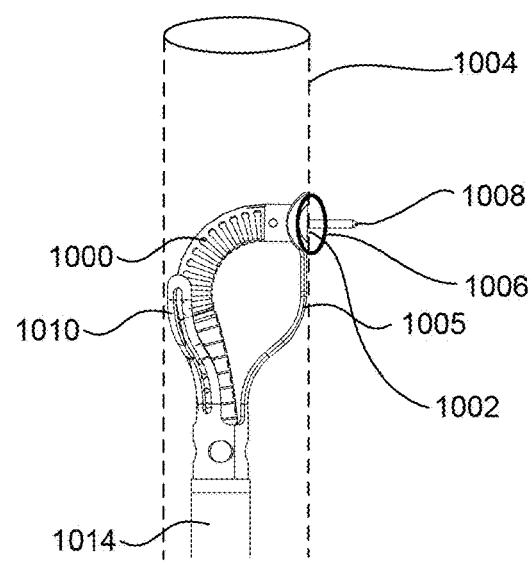
FIG. 10C  FIG. 10D

DEVICES, SYSTEMS, AND METHODS FOR INTRALUMINAL PUNCTURING

CROSS-REFERENCE TO RELATED APPLICATIONS

This application is a continuation of International Application No. PCT/IB2023/061707, filed Nov. 20, 2023, which claims benefit of priority of U.S. Provisional Patent Application No. 63/384,517, filed Nov. 21, 2022, the contents of all of which are incorporated herein by reference in their entireties.

TECHNICAL FIELD

The present disclosure relates generally to intraluminal surgical tool delivery systems and methods thereof, and in particular, to intraluminal systems and methods for delivery and puncture of a wall from within a blood vessel.

BACKGROUND

With the advance of minimally invasive surgery, surgical tools are often delivered through a lumen to work within the lumen. However, piercing a lumen from within can present challenges. Such challenges may arise, for example, when a target puncture site is a blood vessel wall. Due to the relatively small diameters of blood vessels, positioning a tool guide to direct a puncturer at an acute angle relative to the vessel wall may seem like a reasonable option. However, when a blood vessel has a degree of curvature or involves fragile anatomic tissue on the other side of the blood vessel wall, an acute angle of delivery may be associated with risk. Yet the limited inner working diameter of a blood vessel can make increasing an angle of a tool guide positioned to deliver a puncturing tool challenging.

In addition, as one increases the angle of penetration of a needle from within a delivery device at a vessel wall, a number of additional risks present themselves including axial displacement of the delivery device. Thus, there is a need for an intraluminal puncture system capable of a controlled and generally orthogonal puncture relative to the longitudinal axis of the delivery system. The devices, systems, and methods described herein address at least some of the drawbacks of traditional surgical tools. Such devices, systems and methods may reduce the risk of missed or unintentional puncturing, especially in curved vessels, such as with the ability to control the angle of the tool guide at the target vessel. While the devices, systems, and methods described herein may be employed for orthogonal or near orthogonal intralumenal wall piercing, it is to be understood that inventive concepts described herein are not so limited. Depending on the particular application, the principles of this disclosure may be applied to orthogonal and non-orthogonal piercing without departing from the scope and spirit of this disclosure.

SUMMARY

Embodiments consistent with the present disclosure provide devices, systems, and methods for intraluminal puncturing.

Some embodiments involve an intraluminal puncturing system. Such a system may include a first catheter having a flexible positioning arm extending from a distal end thereof and being configured for delivery within an anatomical vessel. The flexible positioning arm may be configured to transition between a collapsed orientation and an expanded orientation. Some embodiments may also include a second catheter disposed within the first catheter. The second catheter may have an opened distal end affixed to the positioning arm such that when the flexible positioning arm is in the expanded orientation, the opened distal end opposes a wall of the anatomical vessel. Some embodiments may further include an elongated shaft extendable through the second catheter and/or may also include a tissue puncturer located on a distal end of the elongated shaft. The tissue puncturer may be configured for axial advancement in the second catheter and operably connected to the opened distal end of the second catheter.

Some embodiments involve a method for puncturing a wall of an anatomical vessel. Such methods may include advancing a flexible catheter having an opened distal end in the anatomical vessel and manipulating the opened distal end so that the opened distal end opposes a target location on the wall of the anatomical vessel. Bracing of the opened distal end within the vessel may be provided to restrict movement of the opened distal end. A tissue puncturer may be advanced through the flexible catheter to puncture the wall of the anatomical vessel at the target location.

BRIEF DESCRIPTION OF THE DRAWINGS

The accompanying drawings, which are incorporated in and constitute a part of this disclosure, illustrate various disclosed embodiments and, together with the description, serve to explain the disclosed embodiments. The particulars shown are by way of example only, to illustrate exemplary embodiments of the present disclosure. The description taken with the drawings makes apparent to those skilled in the art how embodiments of the present disclosure may be practiced.

FIGS. 10A-10D are perspective side views of a portion of an intralumenal puncturing system in sequential phases of deployment during a method for puncturing a wall of an anatomical vessel, consistent with some embodiments of the present disclosure.

DETAILED DESCRIPTION

Figure 1:
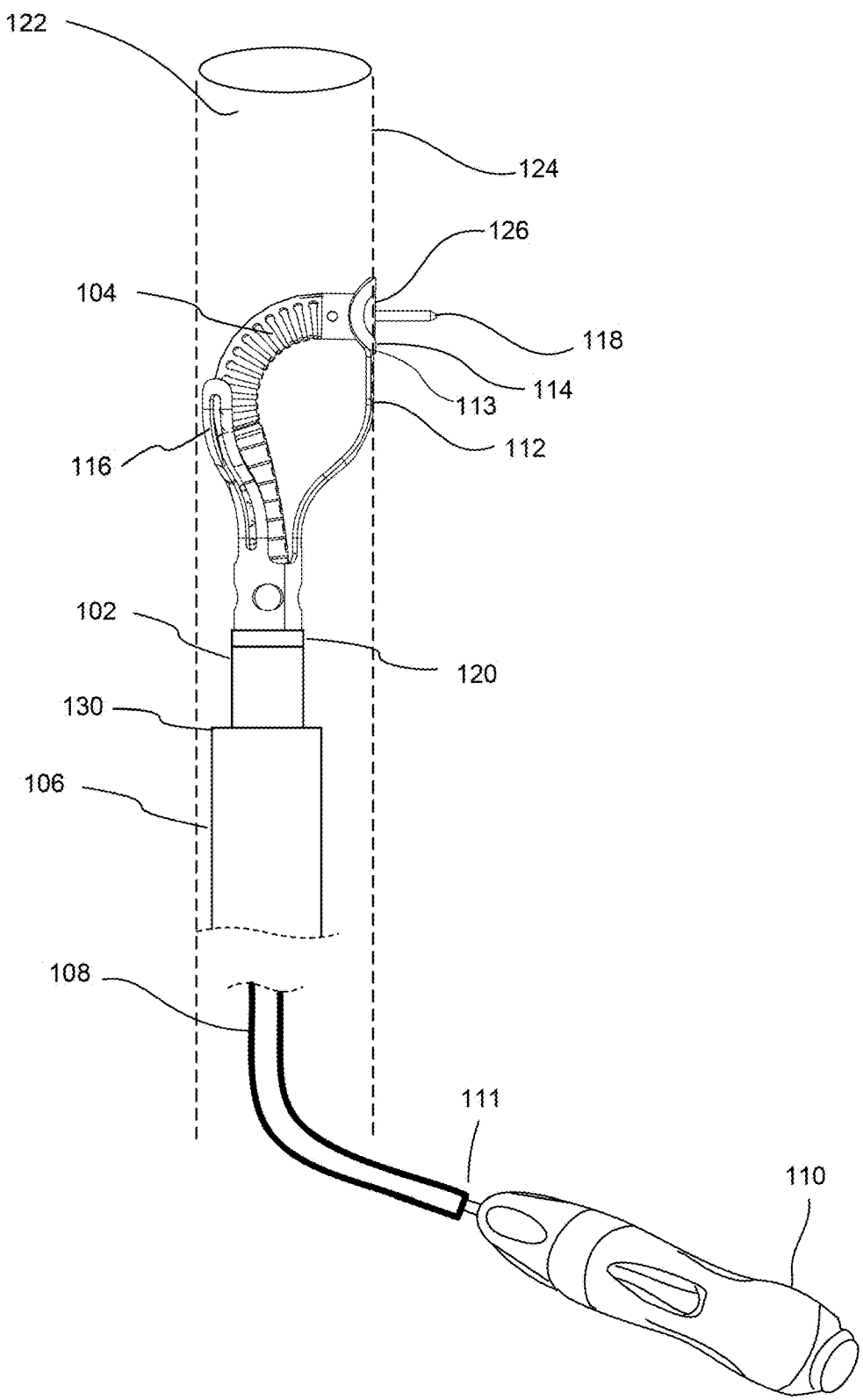
FIG. 1 is a side view of portions of an exemplary intraluminal puncturing system within a vessel, consistent with some embodiments of the present disclosure.

Exemplary embodiments are described with reference to the accompanying drawings. The figures are not necessarily drawn to scale. While examples and features of disclosed principles are described herein, modifications, adaptations, and other implementations are possible without departing from the spirit and scope of the disclosed embodiments. Also, the words "comprising," "having," "containing," "including," and other similar forms are intended to be equivalent in meaning and be open ended in that an item or items following any one of these words is not meant to be an exhaustive listing of such item or items or meant to be limited to only the listed item or items. It should also be noted that, as used herein and in the appended claims, the singular forms "a," "an," and "the" include plural references unless the context clearly dictates otherwise. Moreover, the relational terms herein such as "first" and "second" are used only to differentiate an entity or operation from another entity or operation, and do not require or imply any actual relationship or sequence between these entities or operations.

As used herein, unless specifically stated otherwise, the term "or" encompasses all possible combinations, except where infeasible. For example, if it is stated that a component can include A or B, then, unless specifically stated otherwise or infeasible, the component can include A or B, or A and B. As a second example, if it is stated that a component can include at least one of A, B, or C, then, unless specifically stated otherwise or infeasible, the component can include A, B, or C, or A and B, or A and C, or B and C, or A, B, and C.

This disclosure employs open-ended permissive language, indicating, for example, that some embodiments "may" employ, involve, or include specific features. The use of the term "may" and other open-ended terminology is intended to indicate that although not every embodiment necessarily employs the specific disclosed feature, at least one embodiment employs the specific disclosed feature.

In the following description, various working examples are provided for illustrative purposes. However, is to be understood the present disclosure may be practiced without one or more of these details. Reference will now be made in detail to non-limiting examples of this disclosure, examples of which are illustrated in the accompanying drawings. The examples are described below by referring to the drawings, wherein like reference numerals refer to like elements. When similar reference numerals are shown, corresponding description(s) are not repeated, and the interested reader is referred to the previously discussed figure(s) for a description of the like element(s).

Some disclosed embodiments include an intraluminal puncturing system. An intraluminal puncturing system refers to any device or structure configured to puncture, pierce, enter, or otherwise access an interior of a tubular structure within a body, such as blood vessels, the gastrointestinal tract, or other hollow organs. Examples of an intraluminal puncturing system include a needle configured for insertion into a vein, a catheter configured to puncture an artery, or a blade configured to cut into the tissue of a hollow organ. For example, FIG. 1 shows an exemplary intraluminal puncturing system 100, consistent with some embodiments of the present disclosure. System 100 may include a first catheter 102 having a plurality of arms, including a flexible support arm 116 and a flexible positioning arm 112. Flexible positioning arm 112 may include a puncture positioning structure 113, defining an orifice 114, at a distal end thereof, configured to position a tissue puncturer 118 against a target surface, such as a wall of an anatomical vessel. The second catheter 104 may be configured to control transition between the two operative orientations of the system (i.e., the collapsed and expanded orientation) by axial movement. System 100 may include a second catheter 104 with a flexible distal end configured to shift a puncture positioning structure 113, (i.e., a perimeter defining orifice 114) from a collapsed orientation, orthogonal to a longitudinal axis of first catheter 102, to an angle away from that orthogonal axis, such as an expanded orientation, to position the tissue puncturer 118 against a target surface. Puncture positioning structure 113 may include a planar surface for the purpose of defining the abovementioned orthogonal and angle away from the orthogonal. System 100 may include a second catheter 104 configured to shift a center of orifice 114 or puncture positioning structure 113 in the collapsed orientation which is generally aligned with the longitudinal axis of first catheter 102 to an expanded orientation wherein the central axis of orifice 114 is misaligned relative to the longitudinal axis of first catheter 102. System 100 may also include a sheath 106 configured to collapse and expand arms 116 and 112 during positioning. System 100 may also include a proximal end 108 of first catheter 102 for radial and axial control of the distal end of first catheter 102. The system may additionally include proximal end 111 of second catheter 104 for control the radial movement of opened distal end 126. The system may additionally or alternatively include proximal end 108 of first catheter 102 for control the radial movement of distal end of first catheter 102. Sheath 106 as well as proximal ends 108 and 111 may be individually controlled by a control 110.

Figure 2A:
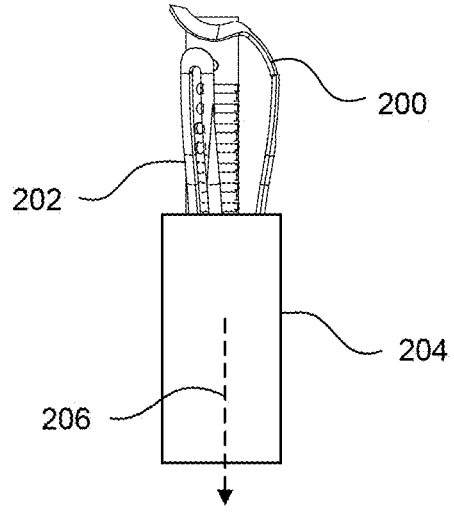
FIGS. 2A and 2B are side views of various configurations of a flexible positioning arm, consistent with some embodiments of the present disclosure.
Figure 2B:
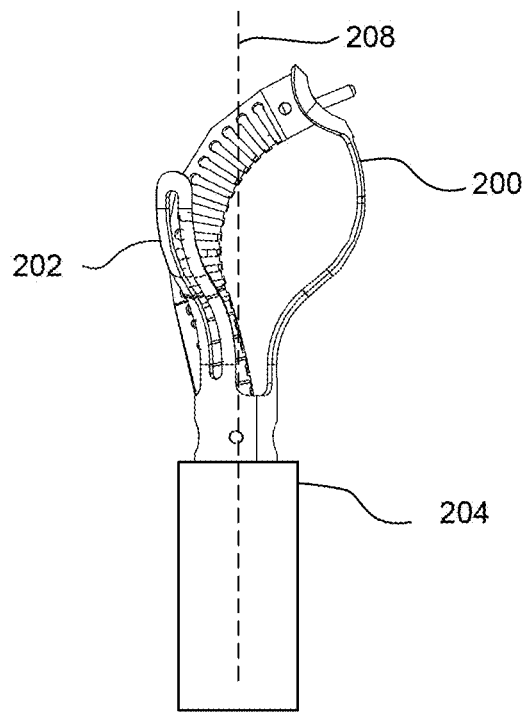

Some disclosed embodiments include a first catheter having a flexible positioning arm extending from a distal end thereof and being configured for delivery within an anatomical vessel, the flexible positioning arm being configured to transition between a collapsed orientation and an expanded orientation. A catheter refers to any slender, hollow, or tube-like medical device configured to access or traverse a body cavity, duct, or blood vessel. Examples of a catheter include straight-tip catheters, curved-tip catheters, J-tip catheters, radiopaque tip catheters, split-tip catheters, balloon-tip catheters, microcatheters, guiding catheters, and catheters with side holes. For example, a first catheter may include a tube with a straight, open-end tip, such as a straight-tip catheter. For example, in FIG. 1, the intraluminal puncturing system 100 includes a first catheter 102 in the shape of a tube with an open end. A flexible positioning arm refers to any branch, prong, extension, or structure configured to bend, twist, or move. Examples of a flexible positioning arm include bendable, malleable, pliable, or otherwise yielding rods, wings, stents, or articulations. For example, in FIG. 1, the first catheter 102 includes a flexible positioning arm 112. In this example, flexible positioning arm 112 is shown as a thin, malleable extension configured to be bent towards and away from first catheter 102. A flexible positioning arm may be made of any suitable biocompatible material. Non-limiting examples include Nitinol, shape memory polymers, stainless steel, titanium and titanium alloys, polymer-based materials, and composites. Extending from a distal end refers to originating or stretching outward from a farthest, outermost, or peripheral side, region, or edge of the first catheter. Examples of extending from a distal end include a structure emanating from, beginning at, reaching out from, or being attached to the distal end. For example, in FIG. 1, flexible positioning arm 112 extends from a distal end 120 of first catheter 102 by emanating from the distal end 120 in a direction away from first catheter 102. While the illustrative example illustrates emanation from the farthest distal edge, this is only an example. Since a distal end may be a region, one or more arms may emanate from a location other than the most distal edge (i.e., extend from an end region) or may be part of a non-arm structure connected to the distal end, and still be considered to extend from the distal end. The first catheter being configured for delivery within an anatomical vessel refers to the first catheter being shaped or particularly manufactured for introduction or placement inside an anatomical vessel, such as blood vessels, arteries, veins, or other tubular structures within the human body, or for smooth axial translation within other tubular or hollow structures, such as a sheath. This may include, for example, being constructed of a biocompatible material, such as PVC, silicone, latex, polyeurethane, Teflon, nylon, or any other material or substance able to perform its desired function within the body without causing an immune response, rejection, or harmful reactions. Other examples of the first catheter being configured for delivery within an anatomical vessel include a first catheter having a diameter small enough to enter a blood vessel, a first catheter configured to be compressed to a diameter of a blood vessel, or a first catheter shaped to move along a curvature of a blood vessel. In some examples, the first catheter may be configured for delivery within an anatomical vessel having a diameter of less than 10 mm, 8 mm, 6 mm, or 4 mm. For example, in FIG. 1, first catheter 102 may have a diameter smaller than 10 mm to enter a blood vessel with a diameter of 10 mm. In some embodiments, the anatomical vessel may be a blood vessel. In some embodiments, the anatomical vessel may be a lumen within a human body. In some embodiments, the system is configured for delivery within an anatomical vessel having a diameter of between 3 mm and 6 mm. A collapsed orientation refers to a state or position of a structure when it is compressed, folded, reduced in maximum distance, width, or span from a central axis, or retracted to a smaller or more compact form. Examples of a collapsed orientation include reducing a maximum distance, width, or span from a central axis of a structure, bringing components of a structure closer together, and folding a structure inwards. For example, FIGS. 2A and 2B show various configurations of a flexible positioning arm, consistent with embodiments of the present disclosure. In some examples, in a collapsed orientation, a maximum diameter of the first catheter may be established when the flexible positioning arm is fully folded or compressed inwards. This may occur, for example, when an arm is located within a catheter or sheath. For example, as illustrated in FIG. 2A, the sheath 204 maintains arm 200 in a compressed state. When the arm 200 (in this example made of a shape memory material) exits the sheath, the arm recovers to its predesigned shape. In such examples, the maximum radius of the first catheter from a central radius of the first catheter may be less than 5 mm, 4 mm, 3 mm, or 2 mm. As shown in the example of FIG. 2A, flexible positioning arm 200 is in a collapsed orientation when it is folded or compressed inwards, such that the maximum distance, width, or span from a central axis of flexible positioning arm 200 is minimal. An expanded orientation refers to a state or position of a structure when it is fully deployed, stretched, or extended to a larger maximum distance, width, or span from a central axis. With shape memory materials, the expanded orientation may refer to achieving shape memory recovery. Examples of an expanded orientation include a structure that has been pulled, opened, or bent to become larger in maximum distance, width, or span from a central axis. In some examples, in an expanded orientation, a maximum diameter of the first catheter may be established when the flexible positioning arm is fully expanded outwards. In such examples, the maximum radius of the first catheter from a central radius of the first catheter may be less than 10 mm, 9 mm, 7 mm, 6 mm, 5 mm, 4 mm, or 3 mm. For example, in FIG. 2B, flexible positioning arm 200 is in an expanded orientation when it reaches its most outward position, (i.e., positioning arm 200 achieves maximum expansion). The flexible positioning arm being configured to transition between a collapsed orientation and an expanded orientation refers to an ability of the flexible positioning arm to change from a state or position which is compact, compressed, or minimized to fully deployed, stretched, or extended. Examples of the flexible positioning arm being configured to transition between a collapsed orientation and an expanded orientation include the flexible positioning arm being openable, twistable, bendable, or otherwise yielding to a change in form. The flexible positioning arm may transition between a collapsed orientation and an expanded orientation either on its own or by external input, such as by a mechanical and/or electrical control. For example, as an alternative to the shape memory material mechanisms that result in expansion, in alternative embodiments, an electronic actuator may cause expansion or a balloon may be inflated to cause expansion. Any such mechanism could cause, an arm, like flexible positioning arm 200 to move from a collapsed orientation, as shown in FIG. 2A, to an expanded orientation, as shown in FIG. 2B, by opening outwards.

Consistent with some disclosed embodiments, a sheath in which the first catheter is located and configured for relative axial movement relative to the first catheter, is configured for holding the flexible positioning arm in the collapsed orientation, and for permitting the flexible positioning arm to transition to the expanded orientation when the flexible positioning arm exits the sheath. A sheath in which the first catheter is located refers to a covering or encasement configured to enclose or shield the first catheter. Examples of a sheath include an arterial sheath, central venous sheath, urinary catheter sheath, pediatric catheter sheath, neurovascular sheath, gastrointestinal sheath, vascular closure sheath, peripherally inserted central catheter sheath, dialysis sheath, venous thrombectomy sheath, thoracic sheath, or any other tubular structure for insertion into a vessel or body cavity. For example, FIG. 1 shows an example of a sheath 106 in which the first catheter 102 is located. In this example, sheath 106 may be a central venous sheath used to access anatomical vessel 122, which may be a vein. The sheath being configured for relative axial movement relative to the first catheter refers to the sheath being shaped or positioned for being inserted and moved in relation to the first catheter. Examples of the sheath being configured for relative axial movement relative to the first catheter include the sheath being movable in proximal and distal directions outside the first catheter, and the sheath being configured to follow a curvature of the first catheter. A sheath is located and configured for relative axial movement if it is part of a device configured to be used for the purpose of relative axial movement. For example, in FIG. 1, sheath 106 is located in and configured to move up and down first catheter 102. The sheath being configured for holding the flexible positioning arm in the collapsed orientation refers to the sheath being positioned or shaped to maintain, support, retain, or preserve the flexible positioning arm in the collapsed orientation. Examples of the sheath being configured for holding the flexible positioning arm in the collapsed orientation include the sheath containing the flexible positioning arm, restricting movement of the flexible positioning arm, or folding the flexible positioning arm inwards. For example, FIG. 2A shows a sheath 204 configured to move in a direction 206 away from flexible positioning arm 200. In this example, sheath 204 may hold flexible positioning arm 200 in a collapsed orientation by keeping flexible positioning arm 200 compressed within the diameter of sheath 204 when flexible positioning arm 200 is located within sheath 204. The sheath being configured for permitting the flexible positioning arm to transition to the expanded orientation when the flexible positioning arm exits the sheath refers to an ability to achieve relative movement between the sheath and the flexible positioning arm (e.g., either through a configuration that permits expulsion of the positioning arm from the sheath, or permits retraction of the sheath from the positioning arm) so that the positing arm is enabled to transition to an expanded orientation, free of restraint by the sheath. For example, in FIG. 2B, when sheath 204 slides away from flexible positioning arm 200, an expansion of flexible positioning arm 200 becomes unrestricted. In this example, the unrestricted expansion of flexible positioning arm 200 causes flexible positioning arm 200 to transition to an unfolded, uncompressed, or expanded orientation. In some embodiments, sheath 204 is configured for holding the flexible positioning arm and the at least one flexible support arm in the collapsed orientation and for permitting the flexible positing arm and the at least one flexible support arm to move to respective expanded orientations when the flexible positioning arm and the at least one flexible support arm 200 exits or is pushed out from sheath 200 or when sheath 200 is retracted from housing the flexible positioning arm and the at least one flexible support arm. Some embodiments may include a sheath in which the first catheter is located and configured for relative axial movement relative to the first catheter for holding the flexible positioning arm and the at least one flexible support arm in the collapsed orientation and for permitting the flexible positing arm and the at least one flexible support arm to move to respective expanded orientations when the flexible positioning arm and the at least one flexible support arm exits the sheath.

Consistent with some disclosed embodiments, the intraluminal puncturing system may be configured to pierce one or more obstacles during delivery. For example, the intraluminal puncturing system may include a serrated surface, pointed end, or rigid boundary to pierce or dislodge one or more obstacles. Examples of obstacles include plaque, blood clots, or foreign material in the way of the sheath on a path, such as within an anatomical vessel.

Some disclosed embodiments include a second catheter disposed within the first catheter and having an opened distal end affixed to the positioning arm such that when the flexible positioning arm is in the expanded orientation, the opened distal end opposes a wall of the anatomical vessel. A second catheter refers to a catheter, as described and exemplified earlier, other than the first catheter. For example, in FIG. 1, the intraluminal puncturing system 100 includes a second catheter 104 which is tubular in shape and bendable. In some embodiments, the second catheter 104 is bendable at the distal end. As used herein, the second catheter having a bendable distal end may be referred to as a flexible catheter. Bendable may refer to the ability to form a bending radius of less than 6 mm or less than 4 mm. The bendable feature may be provided by forming a layer of the second catheter from a series of interconnected, laser cut units or alternatively, forming the second catheter from a flexible material. The second catheter being disposed within the first catheter refers to the second catheter being positioned, inserted, or otherwise located inside the first catheter. Examples of the second catheter being disposed within the first catheter include the second catheter being attached to an interior of the first catheter, the second catheter slidable within the first catheter, and/or the second catheter being positioned within the first catheter. For example, in FIG. 1, second catheter 104 is disposed within first catheter 102 because second catheter 104 is positioned inside first catheter 102. The second catheter having an opened distal end refers to a farthest or terminal part of the second catheter being uncovered, exposed, or accessible. Examples of the second catheter having an opened distal end include the distal end having a hole, a plurality of openings, or having a cavity therein. For example, in FIG. 1, second catheter 104 includes a distal end 126, which is an opened distal end allowing for the entry of a tissue puncturer 118. In some embodiments, the opened distal end of the second catheter is configured to bend radially and axially. The opened distal end being affixed to the positioning arm refers to the opened distal end being attached or secured to the positioning arm. Examples of the opened distal end being affixed to the positioning arm include the opened distal end and the positioning arm being connected by an adhesive, welding, or a mechanical connection, or the opened distal end and the positioning arm being interconnected components of a single structure. Exemplary affixing structures include threaded connectors, snap fit connectors, bayonet connectors, sleeves (mechanically joined by friction or with adhesive or other bonding), ferrules, or any other structures or mechanisms that can be employed to facilitate a connection. For example, in FIG. 1, opened distal end 126 is connected to flexible positioning arm 112 by the attachment of flexible positioning arm 112 to an orifice 114 disposed about opened distal end 126. The opened distal end opposing a wall of the anatomical vessel when the flexible positioning arm is in the expanded orientation refers to the opened distal end being in direct contact, engaged or close proximity to an outer boundary or surface of the anatomical vessel when the flexible positioning arm is in the expanded orientation. Examples of the opened distal end opposing a wall of the anatomical vessel include the opened distal end fully or partially touching, or being within a certain distance of the wall when the flexible positioning arm is in the expanded orientation. For example, FIG. 1 shows an anatomical vessel 122, such as a blood vessel, having a wall 124. In this example, when flexible positioning arm 112 is expanded outwardly, opened distal end 126 is pressed against wall 124. Opened distal end 126 contacts wall 124 in the expanded orientation because as flexible positioning arm 112 expands towards wall 124, it also pulls the connected opened distal end 126 towards wall 124.

Consistent with some disclosed embodiments, at least one flexible support arm is movable from a collapsed orientation to an expanded orientation for cooperating with the flexible positioning arm to secure the distal end opening of the second catheter against the wall of the vessel. A flexible support arm refers to any component shaped or positioned to provide support, hold, or position a structure in a flexible or adjustable manner. Examples of a flexible support arm include bendable, malleable, pliable, or otherwise yielding rods, wings, stents, tabs, leaves, flaps, articulations, or any other appendage. For example, FIG. 1 shows a flexible support arm 116 shaped as a thin, malleable extension configured to be bent towards and away from first catheter 102. In some embodiments, the at least one flexible support arm and the flexible positioning arm include markers for radial and axial positioning of the system, first catheter, or second catheter. In some embodiments, the at least one flexible support arm and the flexible positioning arm include orientation markers. In some embodiments, the at least one flexible support arm and the flexible positioning arm have a common length. In some embodiments, the at least one flexible support arm and the flexible positioning arm have differing lengths. In some embodiments, the flexible positioning arm is substantially less flexible than the at least one flexible support arm. A collapsed orientation and an expanded orientation may be understood as described and exemplified earlier. For example, in FIG. 2A, flexible support arm 202 is in a collapsed orientation when it is compressed inwards, such that the maximum distance, width, or span from a central axis of flexible support arm 202 is minimal. This minimal amount enables smooth axial movement within the vessel. As another example, in FIG. 2B, flexible support arm 200 is in an expanded orientation when it is expanded outwards, such that there is an increase in the maximum distance, width, or span of an axis perpendicular to a central axis of flexible support arm 200. This increased amount is typically sufficient to enable bracing or engagement of the vessel wall in the expanded orientation of flexible support arm 200. The at least one flexible support arm cooperating with the flexible positioning arm to secure the distal end opening of the catheter against the wall of the vessel refers to the least one flexible support arm and the flexible positioning arm moving or functioning together to lock, fix, settle, anchor, or otherwise enable or maintain contact between the distal end opening and the wall. Examples of such cooperation include the least one flexible support arm and the flexible positioning arm moving, rotating, expanding, collapsing, twisting, or pressing against the wall to maintain a position of the distal end opening against the wall. For example, in FIG. 1, flexible support arm 112 and flexible positioning arm 116 are both in an expanded orientation such that flexible support arm 112 and flexible positioning arm 116 press against wall 124. The tightness caused by flexible support arm 112 and flexible positioning arm 116 pressing against wall 124 in FIG. 1 holds distal end opening 126 in place against wall 124.

Figure 4:
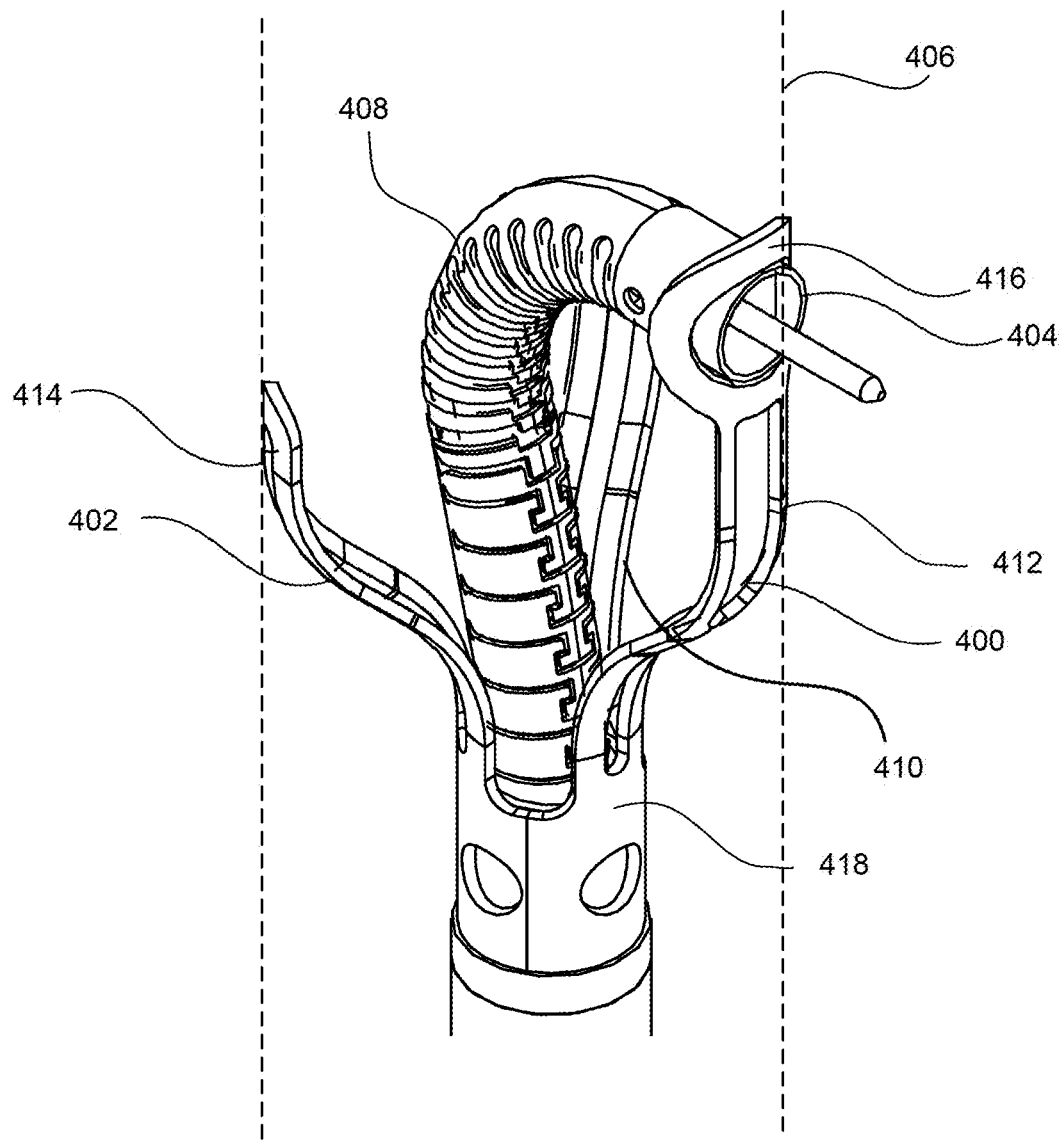
FIG. 4 is a perspective view of a distal end portion of an exemplary intraluminal puncturing system with multiple flexible support arms, consistent with some embodiments of the present disclosure.

Consistent with some disclosed embodiments, at least two flexible support arms are configured to cooperate with the flexible positioning arm to secure the opened distal end of the second catheter against the wall of the vessel. At least two flexible support arms refer to more than one flexible support arm of the same or different type. Examples of at least two flexible support arms include one arm shaped as a wing and another arm shaped as a rod, both arms shaped as wings, or three arms including a wing, rod, and flat sheet. In another example, at least two flexible support arms include two similar flexible support arms. The arms are configured to cooperate when they collectively engage with the vessel wall and cause the open distal end to be static or secured against the vessel wall. Secure in this context is intended to be support, stabilize. In three-point cooperation, for example, three separate arms may engage the vessel wall in three different locations to stabilize the location of the open distal end. Cooperating may refer to working together to result in a friction fit, interference fit, brace or wedge in the vessel. In some embodiments, the flexible support arms may have a larger contact surface, such as wider or broader surfaces, for increased contact with a vessel wall. In other embodiments, an increased number of flexible support arms or other structures may be used for improving securing purposes. FIG. 4 illustrates an example of a three-point arrangement, where positioning arm 400 is aided by a first flexible support arm 402, and a second flexible support arm 410 to secure the opened distal end 404 of the second catheter against the wall 406 of the vessel. In this example, the three arms 400, 402, and 410 press against wall 406 tightly in a friction fit or an interference fit.

Consistent with some disclosed embodiments, the flexible positioning arm includes an orifice therein and wherein the opened distal end of the second catheter is connected to the orifice. An orifice refers to an opening, orifice, or hole. Examples of an orifice include an inlet, mouth, gap, perforation, slit, cavity, slot, or orifice. For example, in FIG. 4, flexible positioning arm 412 includes an orifice 416 in the shape of a circular opening. The flexible positioning arm may include a puncture positioning structure which defines an orifice and has a two dimensional surface which, in the expanded orientation, opposes the target wall. The open distal end 404 of the second catheter is connected to or continuous with orifice 416. This connection can be achieved in any way, including bonding, welding, gluing, unitary formation, mechanical attachment, or any other way of adhesion or joinder. The opened distal end may be formed in various shapes, such as oblong, circular, or rectangular. In such examples, the orifice may be shaped to correspond to or otherwise connect to the oblong, circular, or rectangular opened distal end. In the example shown in FIG. 1, opened distal end 126 is connected to orifice 114 by means of orifice being disposed around opened distal end 126. As one example, the connection shown in FIG. 1 may be a mechanical linkage or welding of opened distal end 126 and orifice 114. As another example, the connection shown in FIG. 1 may include an adhesive attaching opened distal end 126 to orifice 114. In another example, the opened distal end 126 and the orifice is a single unit or continuous part.

Consistent with some disclosed embodiments, the second catheter includes a proximal end configured to enable axial motion of the opened distal end. Configured to enable axial motion may relate to any number of methods such as a proximal end extending out of the sheath or a and/or being engaged with a control means (e.g., control handle). Consistent with some disclosed embodiments, the second catheter includes a proximal end extending out of the sheath and configured to enable control of the opened distal end. A proximal end extending out of the sheath includes an end positioned in a direction opposite to the distal end, which protrudes, emanates, or is otherwise positioned away from the sheath. Examples of a proximal end extending out of the sheath include an end of the second catheter that is opposite to the distal end protruding out of the sheath, and a portion of the second catheter facing a direction opposite to the distal end positioned a certain distance away from an entrance of the sheath. During a procedure, the proximal end may be located outside the human body to provide the surgeon with the ability to control the distal end through manipulation of the proximal end. For example, FIG. 1 shows a control handle 110 connected to the proximal end of the second catheter for radial and axial control of the second catheter 104. In this example, control 140 is connected to proximal end of second catheter 104 and protrudes out of sheath 106. The proximal end being configured to enable control of the opened distal end refers to the proximal end allowing for the management, regulation, or direction of movements or functions of the opened distal end. Examples of the proximal end being configured to enable control of the opened distal end include electrical or mechanical control of a movement, angle, attachment, speed, flexion, extension, or rotation of the opened distal end. For example, in FIG. 1, proximal end 111 of second catheter 104 may control the radial movement of opened distal end 126 along a circumference of wall 124 by controlling the rotation of opened distal end 126.

Consistent with some disclosed embodiments, the flexible positioning arm and the least one flexible support arm are configured to collapse and expand radially relative to a central axis of the system. The flexible positioning arm and the at least one flexible support arm being configured to collapse and expand radially relative to a central axis of the system refers to the arms being configured to move inward and outward in a radial manner with respect to a central axis, of the sheath. Examples of arms configured to collapse and expand in this manner include arms that flex, such as arms made of shape memory materials or other bendable materials. In alternative embodiments, hinged connections, swivels, or other flexible mechanical connections may be employed, so long as they are biocompatible. For example, in FIG. 2B, flexible positioning arm 200 and flexible support arm 202 are configured to open and close towards central axis 208. In this example, flexible positioning arm 200 and flexible support arm 202 may be constructed of a collapsible and expandable Nitinol material or frame.

Consistent with some disclosed embodiments, the at least one flexible support arm and the flexible positioning arm cooperate in their respective expanded orientations to each engage the wall at differing locations. The at least one flexible support arm and the flexible positioning arm cooperating in their respective expanded orientations to each engage the wall at differing locations refers to refers to the least one flexible support arm and the flexible positioning arm moving or functioning together to contact, touch, or interact with the wall at dissimilar locations, as alluded to earlier. Examples of the at least one flexible support arm and the flexible positioning arm cooperating in this way include the at least one flexible support arm and the flexible positioning arm expanding the same distance away from a central axis, the at least one flexible support arm and the flexible positioning arm expanding at the same angle away from a central axis, or one of the at least one flexible support arm and the flexible positioning arm controlling its movement or positioning based on the other engaging the wall. For example, in FIG. 4, flexible support arm 402 and flexible positioning arm 400 cooperate in their respective expanded orientations to each engage wall 406 at differing locations 414 and 412. The differing locations may relate to different circumferential positions along the wall. In this example, flexible support arm 402 and flexible positioning arm 400 may cooperate by expanding in differing directions from a collapsed orientation by a common distance relative to the central axis. As another example, flexible support arm 402 and flexible positioning arm 400 may cooperate by expanding away from a collapsed orientation at a common speed.

Figure 8A:
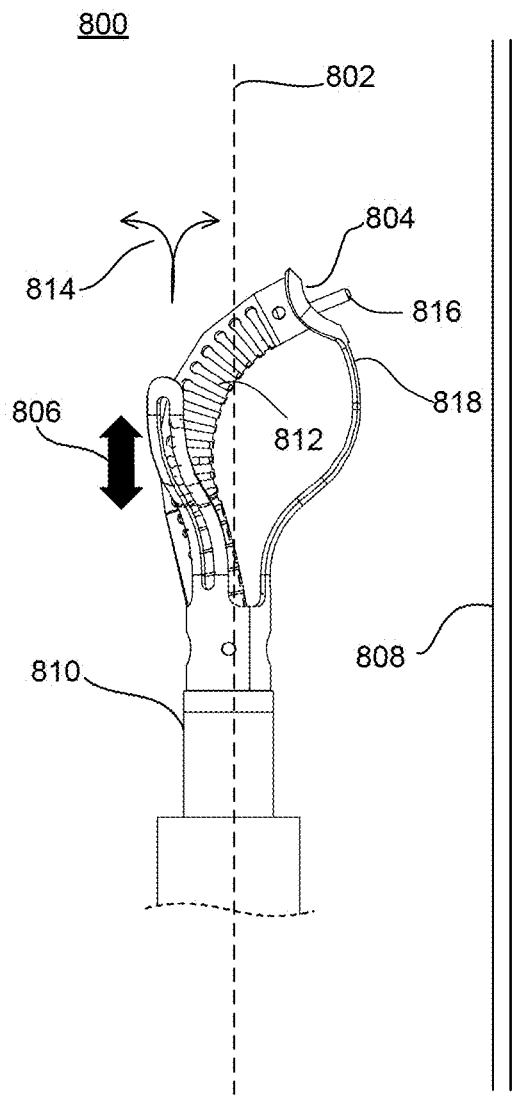
FIGS. 8A and 8B are perspective side views of portions of an intraluminal puncturing system before and after tissue puncturing, consistent with some embodiments of the present disclosure.
Figure 8B:
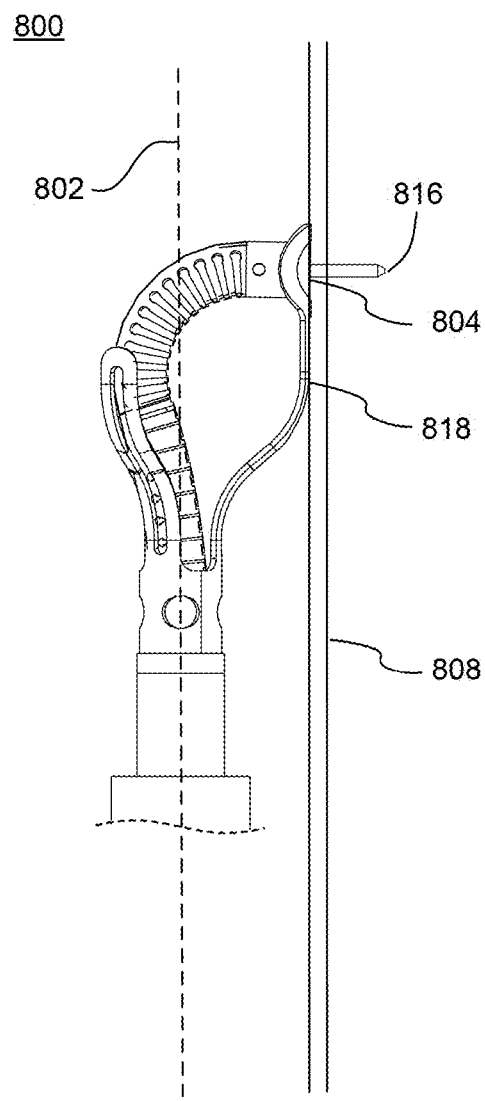

Consistent with some disclosed embodiments, the opened distal end is adjustable between 0 and 180 degrees relative to an elongated axis of the system by axial movement of the second catheter relative to the first catheter. The opened distal end may be adjustable between 0 and 150 degrees relative to an elongated axis of the system. The opened distal end being adjustable between 0 and 180 degrees relative to an elongated axis of the system by axial movement of the second catheter relative to the first catheter refers to a linear or translational movement of the second catheter in relation to the first catheter configured for influencing, adjusting, or otherwise affecting an angle of the opened distal end within a range of 0 and 180 degrees. For example, when the second catheter, with its open end connected to an adjustable arm is moved linearly (e.g., within a first catheter), the orientation of the angular open distal end will change. Because the distal end is constrained on the flexible arm, advancing the second catheter distally will cause the catheter to bend toward the wall of the vessel. Examples of an angle being adjustable in this manner include the second catheter moving within the first catheter to change the angle, both the first catheter and the second catheter moving to change the angle, or the relative movement of the second catheter influencing the movement of another component operably connected to the opened distal, such as the flexible positioning arm, to thereby adjust an angle of the opened distal end. For example, in FIG. 8A, the axial movement 806 of second catheter 812 relative to first catheter 810 causes the curvature of second catheter 812 to adjust an angle of opened distal end 804 between 0 and 180 degrees relative to elongated axis 800. Such axial movement 806 of second catheter 812 may be used to position opened distal end 804 against tissue wall 808, as shown in FIG. 8B. In some embodiments, the second catheter is configured to form a bending radius of less than 6 mm. In some embodiments, the at least one flexible support arm and the second catheter are configured to cooperate to form a bending radius of less than 4 mm and to cooperate with the tissue puncturer to enable tissue puncturing at the bending radius of less than 4 mm.

Figure 3:
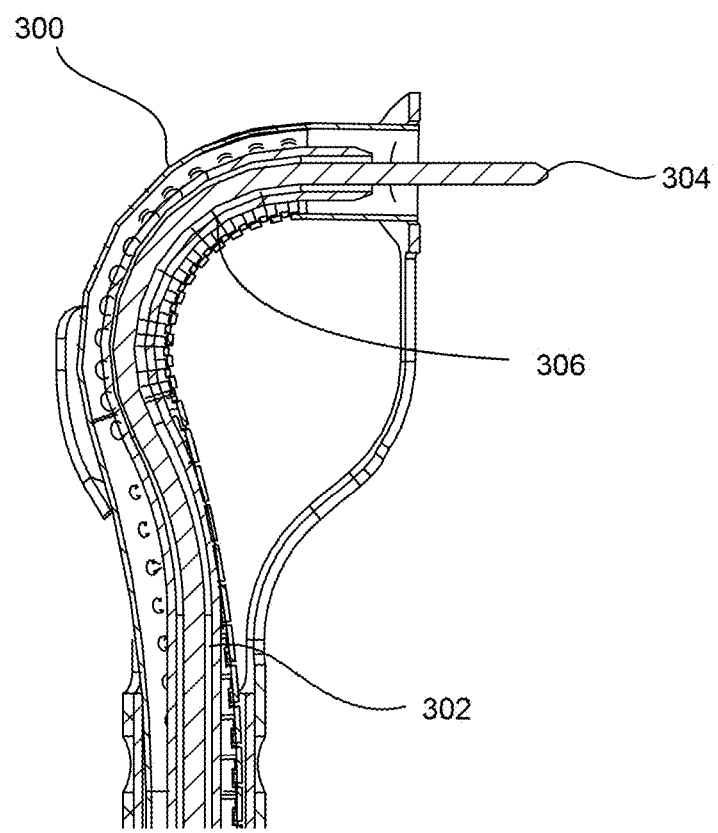
FIG. 3 is a cross-sectional side view of an internal structure of an exemplary second catheter, consistent with some embodiments of the present disclosure.

Some disclosed embodiments include an elongated shaft extendable through the second catheter. An elongated shaft extendable through the second catheter refers to a long slender rod, cylinder or tubular structure that has a length greater than its diameter, and which is configured to be inserted, located, or otherwise positioned in the second catheter. Such an elongated shaft allows for the tissue puncturer via the second catheter to reach or access specific locations within the body or perform particular tasks that require precise control over a length or reach of the shaft using tools configured to be inserted and withdrawn through a lumen of the shaft, such as the delivery of a guidewire after puncturing. The elongated shaft also allows for control (e.g., mechanical control) by an operator or surgeon from an opposing or proximal end. Examples of an elongated shaft extendable through the second catheter include a conduit within the second catheter, a guidewire, a tubular, cylindrical structure inside the second catheter, or an inner lumen of any cross-sectional shape in the second catheter. As one example, FIG. 3 shows the internal structure of an exemplary second catheter, consistent with embodiments of the present disclosure. In this example, second catheter 300 includes an elongated shaft 302 in the shape of a tube extending inside second catheter 300. Elongated shaft 302 may be used to insert or control tools within second catheter 300, such as a tissue puncturer 304.

Figure 6:
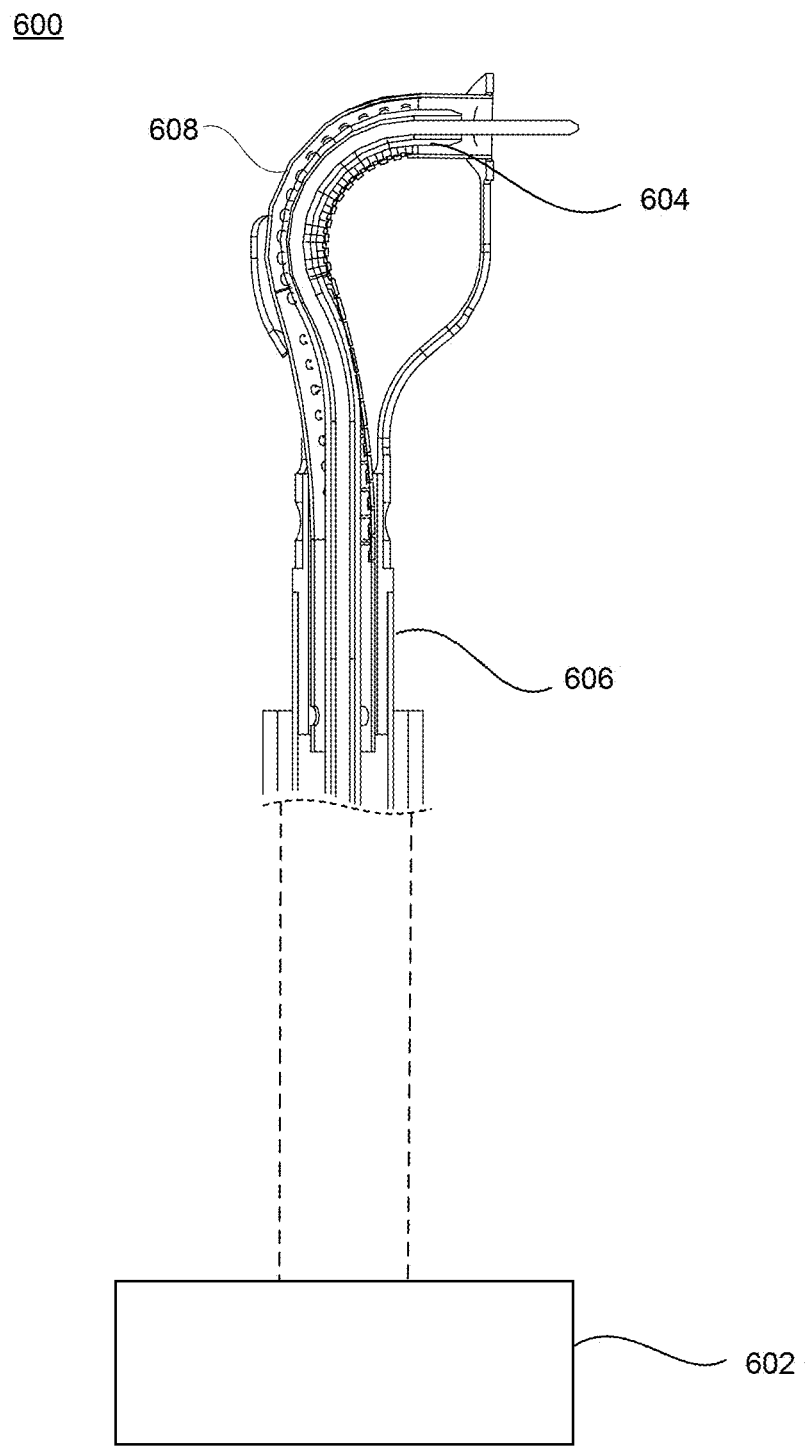
FIG. 6 is a perspective side view of a portion of an intraluminal puncturing system with a control for radial and axial manipulation of each of an elongated shaft, a first catheter, and a second catheter, consistent with some embodiments of the present disclosure.

Consistent with some disclosed embodiments, at least one control is configured for radial and axial manipulation of each of the elongated shaft, first catheter and the second catheter. At least one control includes any device, interface, or manually manipulatable control configured for adjusting, orienting, or positioning in at least two degrees of freedom (i.e., radial and axial). Examples of such a control include hardware and/or software interfaces. Such controls may include one or more of a handle, levers, dial, wheel, screw, locks and/or any other mechanical or electrical actuator. For example, FIG. 6 shows an example of an intraluminal puncturing system 600 with a control 602 for radial and axial manipulation of each of an elongated shaft 604, first catheter 606, and second catheter 608, consistent with embodiments of the present disclosure. In this example, control 602 may be a single robotic controller configured to control radial and axial movements of elongated shaft 604, first catheter 606, and second catheter 608. As another example, control 602 may include a lever to control movements of elongated shaft 604, a handle to control movements of first catheter 606, and an electronic controller to control movements of second catheter 608. Alternatively, as illustrated in FIG. 1, controller 110 may include a handle which may include with one or more knobs, buttons, or levers to individually control differing degrees of freedom of movement. In a simplest example, turning the handle may control radial orientation of the opening 126, and radial movement of the handle relative to a sheath adjacent the handle may control the angle of incidence of the opening 126 to a vessel wall.

Consistent with some disclosed embodiments, the at least one control further includes a lock configured to prevent radial or axial manipulation of at least one of the elongated shaft, first catheter, and the second catheter. A lock configured to prevent radial or axial manipulation of at least one of the elongated shaft, first catheter, and the second catheter refers to devices or systems configured to restrict or inhibit movement in radial or axial directions. Examples of a lock include a mechanical affixing device that prevents relative movement (either axially or radially) of one catheter relative to the other. Other examples of locks include electronic locking interfaces, torque control devices, fixed-length catheters, guidewire locking, locking hub or connector, screws, position-locking rings, and magnetic locks. For example, in FIG. 6, control 602 may be an electronic controller configured to control radial and axial movements of elongated shaft 604, first catheter 606, and second catheter 608. In this example, control 602 may include software instructions to prohibit further radial and axial manipulation once a particular position or angle is achieved by either the elongated shaft, first catheter, and the second catheter.

Some disclosed embodiments include a tissue puncturer located on a distal end of the elongated shaft, the tissue puncturer being configured for axial advancement in the second catheter and operably connected to the opened distal end of the second catheter. A tissue puncturer refers to any device or component configured to pierce, cut, penetrate, ablate (e.g., by chemical, laser or cyroablation) or otherwise create a hole, incision, erode, chip, vaporize, or other break in tissue. A location on a distal end of the elongated shaft refers to a position on a farthest or outermost region of the elongated shaft. Examples of a tissue puncturer include a needle, blade, lancet, sharp edge, or any other structure capable of puncturing tissue. For example, in FIGS. 1 and 3, respective tissue puncturer 118 and 304 are shaped as a needle (the needle can be pointed or blunt tipped so long as it is able to puncture tissue). The tissue puncturer being configured for axial advancement in the second catheter refers to the tissue puncturer being shaped or positioned for being inserted and moved in a line within the second catheter. Examples of the tissue puncturer being configured for axial advancement in the second catheter include the tissue puncturer sliding within a lumen of the second catheter, or the tissue puncturer following a curvature of the second catheter through an elongated shaft within the second catheter. For example, in FIG. 3, tissue puncturer 304 may be moved within second catheter 300 by pushing and pulling tissue puncturer 304 inside elongated shaft 302. This might occur, for example, through manipulation of a lever or other advancing mechanism on control 110 (FIG. 1). The tissue puncturer being operably connected to the opened distal end of the second catheter refers to a functional relationship or connection between the tissue puncturer and the opened distal end of the second catheter that configures the tissue puncturer and opened distal end to work together or move or function in a coordinated manner. Examples of the tissue puncturer being operably connected to the opened distal end of the second catheter include the two structures being connected in such a way that the movement of the opened distal end influences the movement of the tissue puncturer, or the movement of the tissue puncturer influences the movement of the opened distal end by either connection of the two structures or a coordinated movement or operation of the two structures. For example, in FIG. 1, the opened distal end 126 houses the tissue puncturer 118 such that when the opened distal end opposes wall 124, tissue puncturer 118 is positioned to pierce anatomical vessel 122 through wall 124. The piercing may be achieved when the needle is advanced, such as through a control on handle 110 or in control 602. In some embodiments, the tissue puncturer may be or include a needle, hollow tube, or wire. In some embodiments the tissue puncturer may have an outer diameter less than 4 mm, 3 mm, 2 mm, 1 mm, or 0.5 mm.

Consistent with some disclosed embodiments, the elongated shaft includes a proximal end extending out of the second catheter and configured to enable control of the tissue puncturer. A proximal end extending out of the second catheter includes an end located opposite the distal end of the second catheter, which protrudes, emanates, or is otherwise positioned away from the second catheter. Examples of a proximal end extending out of the catheter include an end of the elongated sheath that is opposite to the distal end of the second catheter and protruding out of the second catheter, and a portion of the elongated sheath facing a direction opposite to the distal end of the second catheter and positioned a certain distance away from an entrance of the second catheter. For example, FIG. 1 shows a control 110 for radial and axial control of the second catheter 104. As an example, control 110 may be configured to manipulate a proximal end of an elongated sheath 106 which houses first catheter 102 and second catheter 104. Additionally or alternatively, control 110 may be configured to manipulate a proximal end of first catheter 104 or first catheter 102 which may protrude out of sheath 106. The proximal end being configured to enable control of the tissue puncturer refers to the proximal end allowing for manipulation of the tissue puncturer. Examples of the proximal end being configured to enable control of the tissue puncturer include electrical or mechanical control of a movement, angle, attachment, speed, flexion, extension, or rotation of the tissue puncturer. For example, in FIG. 1, controller 110 may control the movement of tissue puncturer 118 along a length of wall 124 by controlling a bending or angle of tissue puncturer 118.

Consistent with some disclosed embodiments, the tissue puncturer includes a sharp edge or sharp blade configured to pierce tissue. A sharp edge or sharp blade configured to pierce tissue refers to any cutting, perforating or pointed structure configured to penetrate or incise tissue, such as skin, muscles, vessels, or organs. Examples of a sharp edge configured to pierce tissue include scalpels, needles, and serrated surfaces. Examples of a sharp blade include a straight blade, serrated blade, drop point blade, clip point blade, tanto blade, Bowie blade, harkbill blade, spey blade, a blunt tip needle, and needle point blade. For example, FIG.

5 shows an example of an intraluminal puncturing system 500 with a pointed tissue puncturer 502, consistent with some embodiments of the present disclosure. In this example, tissue puncturer 502 has a flat shape with an inclined edge, creating a sharp surface facilitating the piercing of tissue.

Figure 5:
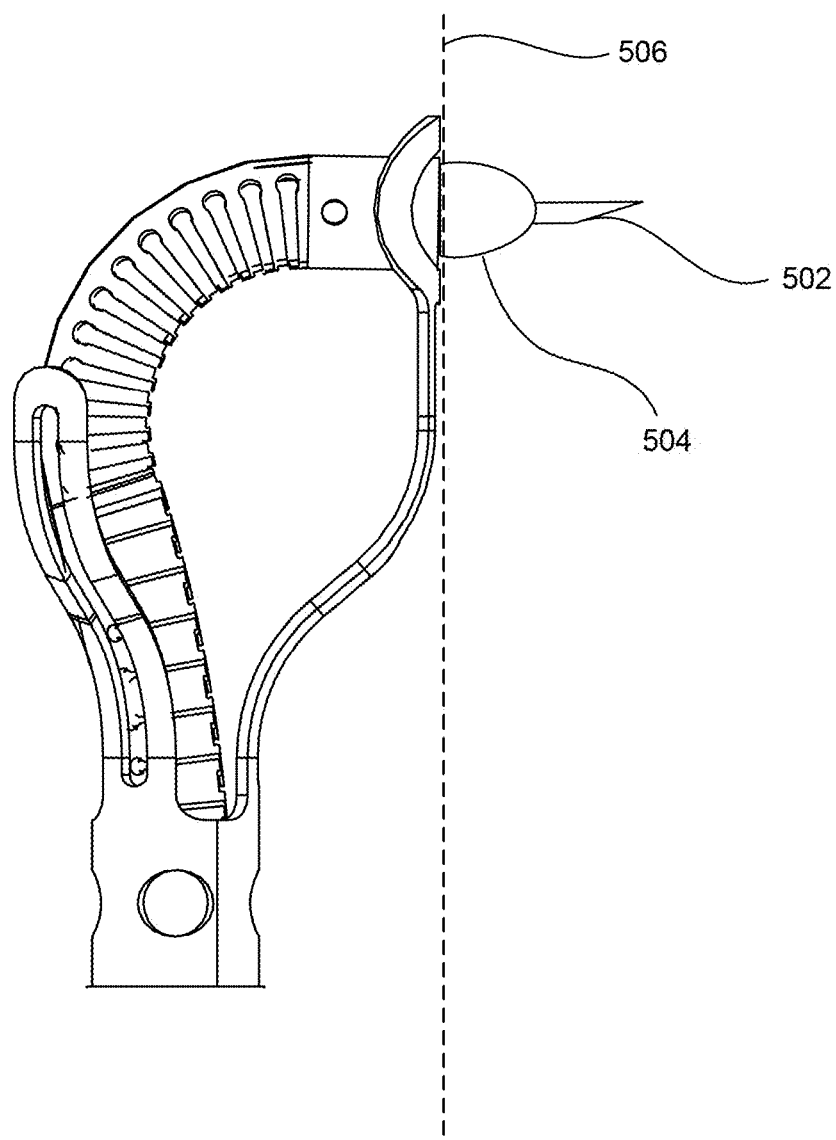
FIG. 5 is a perspective side view of an example of a distal end portion of an intraluminal puncturing system with a blade-shaped tissue puncturer piercing a vessel wall, consistent with some embodiments of the present disclosure.

Consistent with some disclosed embodiments, a dilator is configured to dilate an opening in the vessel wall caused by the tissue puncturer. A dilator configured to dilate an opening in the vessel wall refers to a structure or device configured to further open, enlarge, or widen the opening, such as to accommodate the insertion of other medical instruments or tools. Examples of a dilator include a Seldinger dilator, valvulotome, balloon, expanding stent, or any other structure that once received in the opening expands to widen the opening. For example, FIG. 5 shows an example of a balloon dilator 504 configured to dilate an opening in the vessel wall 506 caused by tissue puncturer 502. In this example, balloon dilator 504 may be integrated into any part of the intraluminal puncturing system 500, such as a distal tip of the elongated shaft or the second catheter. Once tissue puncturer 502 causes an opening in vessel wall 506 by cutting into vessel wall 506, balloon dilator 504 may be inflated, such as by activating an integrated inflation port allowing for inflation with a syringe, or injecting a sterile saline solution or contrast dye through the elongated shaft and into the balloon. As balloon dilator 504 expands, it expands radially, pressing against the opening in vessel wall 506, further widening the opening. Control of a dilator may be exercised through control 110 or 602 as illustrated in FIGS. 1 and 6, respectively.

Consistent with some disclosed embodiments, the dilator is configured for delivery over the elongated shaft. The dilator being configured for delivery over the elongated shaft refers to the dilator being shaped or positioned for being introduced or delivered into a specific location or anatomical structure by being advanced or inserted over the shaft. Examples of the dilator being configured for delivery over the elongated shaft include a dilator introduced over the elongated shaft, and a shaft designed with a dilator configured to move up and down the exterior of the shaft. Such movement may occur by pushing a guidewire connected to a structure on which the balloon dilator is mounted. Such movement may be controlled via a standalone guidewire or via controller 110 or 602. Alternatively, the dilator may be prepositioned in proximity to the puncturer. In one embodiment, the dilator may be moveable with the puncture such that following initial puncturing, as the dilater is advanced, in enters the puncture site. FIG. 3 shows an example of dilator 306 in the form of an inflatable balloon configured for delivery over elongated shaft 302. In this example, dilator 306 may be advanced over elongated shaft 302 from a proximal end of second catheter 300.

Figure 7:
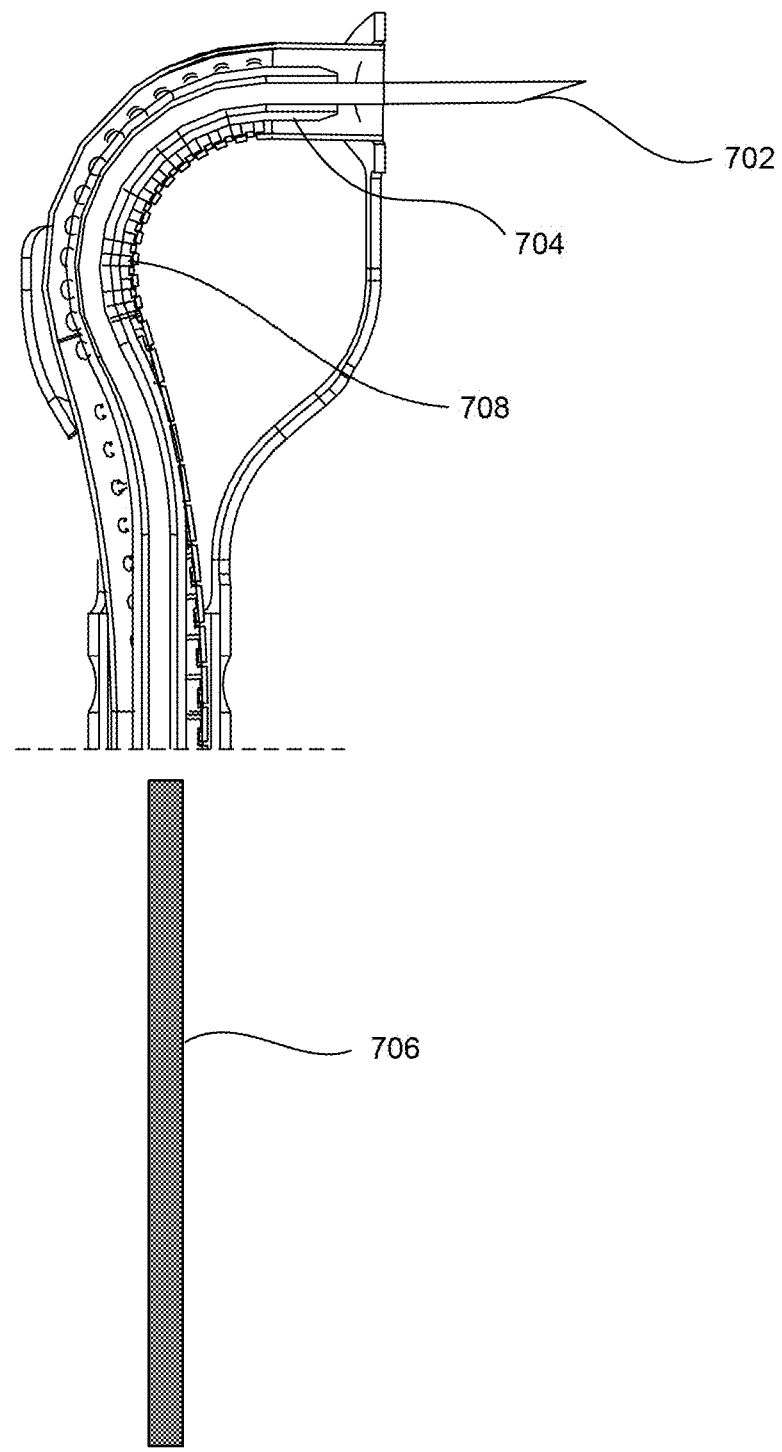
FIG. 7 is a perspective side view of an exemplary hollow tube in the second catheter configured to act as a placeholder during replacement of the puncturer with a guidewire, consistent with some embodiments of the present disclosure.

Consistent with some disclosed embodiments, a hollow tube in the second catheter is configured to act as a placeholder during replacement of the puncturer with a guidewire. Replacement of the puncturer with a guidewire refers to a substitution or exchange of the puncturer with a long, thin, or flexible wire or tube configured for insertion into a body. Use of a placeholder during replacement of the puncturer may be important immediately after puncturing a hole and prior to positioning of a medical device, such as a shunt, within the puncture hole. Examples of replacing the puncturer with a guidewire include axially sliding the hollow tube over the puncturer, partially retracting the puncturer within the hollow tube, sliding a guidewire through, alongside or over the puncturer and through the hollow tube, and optionally fully retracting the tissue puncturer from the system. A hollow tube in the second catheter is configured to act as a placeholder during replacement of the puncturer with a guidewire. A hollow tube refers to a tubular or elongated three-dimensional structure with an empty, depressed, pitted, or sunken interior. Examples of a hollow tube include circular, rectangular, square, oval, triangular, hexagonal, octagonal, teardrop, D-shaped, or C-shaped tubes. For example, FIG. 7 shows an exemplary hollow tube 704 in the second catheter 708 configured to act as a placeholder during replacement of the puncturer 702 with a guidewire 706, consistent with some embodiments of the present disclosure. In one example, hollow tube 704 may be a cylindrical tube positioned at the distal end of second catheter 708. In other embodiments, hollow tube 704 may be positioned at other locations or extend along the length of second catheter 708. As one example, puncturer 702 may be replaced with guidewire 706 by withdrawing puncturer 702 from second catheter 708, and then inserting guidewire 706 into second catheter 708. In this example, hollow tube 704 may hold the distal end of second catheter 708 open or wide enough for guidewire 706 to be inserted. As another example, hollow tube 704 may be retracted following the replacement of puncturer 702 with guidewire 706. In some embodiments, hollow tube 704 may be used to introduce or withdraw other structures. In other embodiments, hollow tube 704 may be configured as a dilator. In this embodiment, subsequent to replacement of the puncturer by hollow tube 704, the hollow tube may be expanded or inflated to expand the puncture hole for example, prior to placement of a shunt.

Consistent with some disclosed embodiments, an angle of the opened distal end is adjustable between 0 and 180 degrees relative to a central axis of the system to permit tissue puncturing at selected angles between 0 and 150 degrees. An angle of the opened distal end being adjustable between 0 and 180 degrees relative to a central axis to permit tissue puncturing at selected angles between 0 and 150 degrees refers to the angle being modifiable, adaptable, or otherwise changeable in relation to a central axis within the range of 0 and 180 degrees, such that tissue may be cut, incised, or perforated at a desired angle within the range of 0 and 150 degrees. Examples of an angle of the opened distal end being adjustable in this manner include the open distal end being modifiable between 0 and 180 degrees, or a connected structure, such as the second catheter, being configured to move the open distal end between positions corresponding to angles between 0 and 180 degrees. For example, FIGS. 8A and 8B show an example of an intraluminal puncturing system 800 before and after tissue puncturing, consistent with embodiments of the present disclosure. In FIG. 8A, an angle of opened distal end 804 of second catheter 812 is adjustable between 0 and 180 degrees relative to central axis 802 to permit puncturing of tissue wall 808 at selected angles between 0 and 150 degrees. In this example, the angle of opened distal end 804 of second catheter 812 may be adjustable by a movement of second catheter 812 towards or away from tissue wall 808.

Consistent with some disclosed embodiments, the distal end of the second catheter is configured to bend towards the wall to enable the tissue puncturer to puncture the wall orthogonally. The second catheter being configured to bend towards the wall to enable the tissue puncturer to puncture the wall orthogonally refers to the second catheter flexing or curving, such that tissue puncturer is brought into a position or angle for piercing the wall perpendicularly, or at a right angle. Such bending mechanism are discussed elsewhere herein. Examples of the second catheter being configured to bend in this way include rotation, flexion, turning, folding, or curling of the second catheter while it is operably connected to the tissue puncturer. For example, in FIG. 8A, second catheter 812 may be configured to bend in directions 814 to the left and right of central axis to enable tissue puncturer 816 to puncture wall 808 orthogonally. In this example, second catheter 812 may be made of a bendable material. The bending may occur as the result of the second catheter 812 being advanced along axis 802. Because the connection of opening 804 to flexible positioning arm 818 restricts axial movement of open end 804, the axial advancement of second catheter 812 causes the second catheter 812 to bend, thereby moving opening 804 toward vessel wall 808.

Consistent with some disclosed embodiments, the at least one flexible support arm is configured to be positioned relative to the wall to enable the tissue puncturer to puncture the wall orthogonally. This refers to the at least one flexible support arm being movable or adjustable in relation to the wall, such that tissue puncturer is brought into a position or angle for piercing the wall perpendicularly, or at a right angle. Vessels do not always extend in straight lines and therefore the reference to orthogonal is not meant to suggest a perfect 90 degree puncture every time. Rather, orthogonal in this context refers to generally piercing the wall head-on as opposed to intentionally piercing at an obviously acute angle. Examples of the at least one flexible support arm being configured to be positioned relative to the wall to enable the tissue puncturer to puncture the wall orthogonally include rotation, flexion, turning, folding, or curling of the at least one flexible support arm. For example, in FIG. 1, flexible support arm 116 may be configured to expand and press against wall 124 so that tissue puncturer 118 can puncture wall 124 orthogonally. In this example, the pressure of flexible support arm 116, in addition to the pressure of flexible positioning arm 112, against wall 124 enables tissue puncturer to pierce wall 124 at a right angle by holding system 100 in place.

Figure 9:
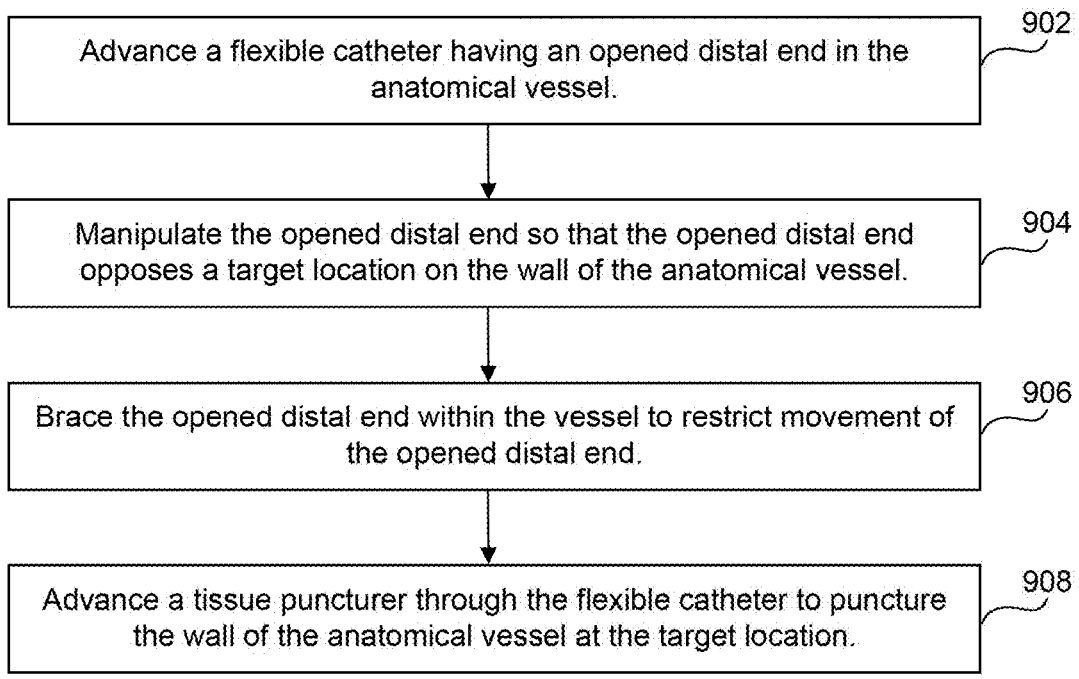
FIG. 9 is a flowchart of an exemplary process for puncturing a wall of an anatomical vessel, consistent with some embodiments of the present disclosure.

Some disclosed embodiments involve a method for puncturing a wall of an anatomical vessel. A method for puncturing a wall of an anatomical vessel refers to any procedure or technique used to create an intentional opening or perforation in the wall of a biological vessel within the human body. FIG. 9 is a flowchart of an exemplary process 900 for puncturing a wall of an anatomical vessel, consistent with some embodiments of the present disclosure. Process 900 is not restricted to any particular structure outside what is recited in the flow chart. By way of one example, the process may be performed by an intraluminal puncturing system (e.g., intraluminal puncturing system 100 in FIG. 1, intraluminal puncturing system 500 in FIG. 5, intraluminal puncturing system 600 in FIG. 6, intraluminal puncturing system 700 in FIG. 7, intraluminal puncturing system 800 in FIG. 8) to perform operations or functions described herein. Consistent with some disclosed embodiments, the anatomical vessel includes a coronary sinus. For example, anatomical vessel 122 shown in FIG. 1 may be a coronary sinus, with wall 124 being a wall of the coronary sinus.

Some disclosed embodiments involve advancing a flexible catheter having an opened distal end in the anatomical vessel. Referring to FIG. 9, process 900 includes a step 902 of advancing a flexible catheter having an opened distal end in the anatomical vessel. A flexible catheter refers to a catheter as described and exemplified earlier, which is configured to bend or conform to a curvature or passage within the body. An opened distal end may be understood as described and exemplified earlier for a second catheter having an opened distal end. Advancing a flexible catheter having an opened distal end in the anatomical vessel refers to moving or progressing the flexible catheter (i.e., the second catheter having a distal bendable) into the anatomical vessel, through a natural or surgically created opening. Examples of advancing a catheter include inserting a catheter into the anatomical vessel, and guiding a catheter within the anatomical vessel. For example, FIGS. 10A-10D show an example of a method for puncturing a wall of an anatomical vessel, consistent with some embodiments of the present disclosure. In FIG. 10A, a flexible catheter 1000 having an opened distal end 1002 may be guided into an anatomical vessel 1004, such as a blood vessel. Flexible catheter 1000 may be incorporated into an intraluminal puncturing system, such as the ones described and exemplified earlier, including intraluminal puncturing system 100 in FIG. 1, intraluminal puncturing system 500 in FIG. 5, intraluminal puncturing system 600 in FIG. 6, intraluminal puncturing system 700 in FIG. 7, and intraluminal puncturing system 800 in FIG. 8. Flexible catheter 1000 may be further understood by the figures described and exemplified earlier. For example, flexible catheter 1000 may be equivalent to second catheter 104 of intraluminal puncturing system 100 in FIG. 1, second catheter 608 of intraluminal puncturing system 600 in FIG. 6, second catheter 708 of intraluminal puncturing system 700 in FIG. 7, or second catheter 812 of intraluminal puncturing system 800 in FIG. 8.

Some disclosed embodiments involve manipulating the opened distal end so that the opened distal end opposes a target location on the wall of the anatomical vessel. Referring to FIG. 9, process 900 includes a step 904 of manipulating the opened distal end so that the opened distal end opposes a target location on the wall of the anatomical vessel. A target location refers to a specific point, place, or site for an intended purpose, such as puncturing. Examples of a target location on the wall of the anatomical vessel include a point on the wall, a side of the wall, a section of the wall, or a location corresponding to a type of tissue on the wall. Or the target location may correspond to an organ outside the vessel at the target location. In some use cases, piercing forms an opening both in the vessel wall but also in the adjacent organ. In FIGS. 10A-10B, a target location 1006 is shown as a region of wall 1004. The opened distal end opposing a target location refers to the opened distal end being positioned or oriented such that it faces or is directed towards the target location. Examples of the opened distal end opposing a target location include the opened distal end facing a direction of the target location, the opened distal end extending towards the target location, or the opened distal end being positioned near the target location. For example, in FIG. 10B, opened distal end 1002 may oppose target location 1006 by facing towards target location 1006. Manipulating the opened distal end so that the opened distal end opposes a target location on the wall of the anatomical vessel refers to adjusting or positioning the opened distal end. Examples of manipulating the opened distal end include moving the opened distal end axially, changing an angle of the opened distal end or a planar surface thereof, or expanding the configuration of the open distal end (i.e., altering an angle of a planar surface thereof) relative to a central axis of the system. For example, opened distal end 1002 in FIG. 10A may be manipulated by axial and radial movement of the second catheter, said opened distal end further being affixed or operatively connected to the first catheter (or an orifice thereof). This axial and radial movement enables controlled movement towards target location 1006, such that opened distal end 1002 faces target location 1006 on wall 1004, as shown in FIG. 10B.

Consistent with some disclosed embodiments, manipulating the opened distal end includes bending a flexible positioning arm to which the distal open end is connected. A flexible positioning arm may be understood as described and exemplified earlier. For example, FIG. 1 shows an example of a flexible positioning arm 112 to which distal open end 126 is connected. Bending a flexible positioning arm may involve changing a shape or direction of the flexible positioning arm. Examples of bending a flexible positioning arm include curving, flexing, twisting, collapsing, expanding, or rotating the flexible positioning arm, regardless of the mechanism of manipulation. For example, in FIG. 8A, open distal end 804 is connected to flexible positioning arm 818. In this example, bending flexible positioning arm 818 away from central axis 802 may change the position of open distal end 804 to oppose vessel wall 808, as shown in FIG. 8B. In some embodiments, manipulating the opened distal end may include expanding a flexible positioning arm by bending or curving the flexible positioning arm as it converts form a straight form to a bent or curved form.

Consistent with some disclosed embodiments, manipulating includes adjusting an angle of the opened distal end. Adjusting an angle of the opened distal end refers to changing an orientation or alignment of the opened distal end relative to a central axis. Examples of adjusting an angle of the opened distal end include moving the opened distal end by manual control of the flexible catheter or by an electronic controller configured to control motion of the flexible catheter. For example, opened distal end 1002 in FIG. 10A may be manipulated by increasing an angle of opened distal end 1002 relative to a central axis of flexible catheter to a larger angle, as shown in FIG. 10B. In this example, increasing the angle of opened distal end 1002 may be accomplished by pushing flexible catheter 1000 or moving a connected structure, such as an expandable arm 1005. In another example, increasing the angle of opened distal end 1002 may be accomplished by removing a sheath to expand a portion of expandable arm 1005 and pushing flexible catheter 1000.

Consistent with some disclosed embodiments, manipulating includes adjusting an angle of the flexible positioning arm. Adjusting an angle of the flexible positioning arm refers to changing an orientation or alignment of the flexible positioning arm. Examples of adjusting an angle of the flexible positioning arm include moving the flexible positioning arm by manual control of the flexible catheter or flexible positioning arm (e.g., through the use of a hand held controller such as controller 110 in FIG. 1) or by an electronic controller configured to control motion of the flexible catheter or flexible positioning arm (e.g., through the use of any other controller, electronic or otherwise, such as controller 602 in FIG. 6). For example, the flexible positioning arm 200 in FIG. 2A may be adjusted to a wider angle away from a central axis 208 by being pulled outwards from central axis 208, as shown in FIG. 2B. Adjusting an angle of the flexible positioning arm may involve adjusting a positioning of a puncture positioning structure, such as puncture positioning structure 113 in FIG. 1. For example, puncture positioning structure 113 may be moved outwards from a central axis of system 100 to adjust an angle of flexible positioning arm 112 or alternatively, puncture positioning structure 113 may be moved radially by rotating first catheter 102.

Consistent with some disclosed embodiments, manipulating includes adjusting a distance of the opened distal end from the wall. Adjusting a distance of the opened distal end from the wall refers to changing a spacing or proximity between the opened distal end and the wall. Examples of adjusting a distance of the opened distal end from the wall refers to pulling the opened distal end radially away from the wall or moving the opened distal end axially away from the wall. For example, a distance of the opened distal end 1002 from wall 1004 in FIG. 10A may be reduced by bringing opened distal end 1002 closer to wall 1004, as shown in FIG. 10B.

Consistent with some disclosed embodiments, manipulating includes adjusting a distance of the flexible positioning arm from the wall. Adjusting a distance of the flexible positioning arm from the wall refers to changing a spacing or proximity between the flexible positioning arm and the wall. Examples of adjusting a distance of the flexible positioning arm from the wall refers to pulling the flexible positioning arm radially away from the wall or moving the flexible positioning arm axially away from the wall. For example, the flexible positioning arm 200 in FIG. 2A may be adjusted to have a smaller distance from surrounding wall by being pulled outwards from central axis 208, as shown in FIG. 2B.

Consistent with some disclosed embodiments, manipulating includes axial or radial manipulation of the flexible catheter. Axial or radial manipulation of the flexible catheter includes the management, regulation, or direction of movements or functions of the flexible catheter along a central axis or perpendicular to a central axis. Examples of axial or radial manipulation of the flexible catheter include sliding the flexible catheter up or down, rotating the flexible catheter, bending the flexible catheter, or twisting the flexible catheter. For example, the flexible catheter 1000 in FIG. 10A may be pushed distally, such that opened distal end 1002 faces target location 1006 on wall 1004, as shown in FIG. 10B.

Some disclosed embodiments involve bracing the opened distal end within the vessel to restrict movement of the opened distal end. Bracing may include any form of securing. Examples include three-point positioning, interference fitting, or wedging. Referring to FIG. 9, process 900 includes a step 906 of bracing the opened distal end within the vessel to restrict movement of the opened distal end. Restricting movement of the opened distal end refers to limiting, controlling, or preventing a motion of the opened distal end. Examples of restricting the movement of the opened distal end include locking the opened distal end in place, or limiting a range of motion of the opened distal end through one of the techniques discussed above. For example, movement of the opened distal end may be restricted in an axial direction by blocking axial movement of the flexible catheter at one or more locations. Bracing the opened distal end within the vessel to restrict movement of the opened distal end refers to providing support or stabilizing the distal end inside the vessel. In some embodiments, bracing the opened distal end within the vessel may also or alternatively include using primed flexible arms, anchors, inflatable balloons, or hooks. As an example, a flexible positioning arm is affixed to the opened distal end such that when the flexible positioning arm is in the expanded orientation, the opened distal end of the second catheter is braced within the anatomical vessel. In this way, although the opened distal end is at a distal end of a flexible catheter, it is secured in place by a puncture positioning structure 113, defining an orifice 114 in the second catheter 104. In another example, bracing the opened distal end within the vessel may involve inflating an inflatable balloon near the opened distal end. In this example, the expanded balloon may apply pressure against the vessel wall, keeping the opened distal end in place.

Consistent with some disclosed embodiments, bracing includes causing a plurality of flexible braces to expand against differing locations on the vessel wall. A plurality of flexible braces refers to two or more supportive structures or components configured to provide stability, reinforcement, or flexibility. Examples of flexible braces include wings, flaps, arms, or any other structure mentioned herein. For example, in FIG. 4, a plurality of flexible braces may include a first flexible support arm 402 and a second flexible support arm 410. Causing a plurality of flexible braces to expand against differing locations on the vessel wall refers to enlarging or widening the flexible braces towards or to make contact with various positions or regions on the vessel wall. Examples of causing a plurality of flexible braces to expand against differing locations on the vessel wall include the braces opening outwards, changing shape, or being pulled towards the vessel wall. For example, as shown in FIG. 4, first flexible support arm 402 and second flexible support arm 410 may open towards different locations on vessel wall 406 by moving away from a central axis of an intraluminal puncturing system.

Some disclosed embodiments involve advancing a tissue puncturer through the flexible catheter to puncture the wall of the anatomical vessel at the target location. Referring to FIG. 9, process 900 includes a step 908 of advancing a tissue puncturer through the flexible catheter to puncture the wall of the anatomical vessel at the target location. A tissue puncturer may be understood as described and exemplified earlier. For example, FIG. 10D shows an example of a tissue puncturer 1008 in the form of a needle. Advancing a tissue puncturer through the flexible catheter to puncture the wall of the anatomical vessel at the target location refers to moving or progressing the tissue puncturer within the flexible catheter to pierce the wall or to deliver the tissue puncturer at a location enabling the tissue puncturer to pierce the wall at the target location. Examples of advancing a tissue puncturer through the flexible catheter include inserting a tissue puncturer into the flexible catheter and/or guiding at least a portion of the tissue puncturer within the flexible catheter. For example, in FIG. 10D, a tissue puncturer 1008 may be advanced through flexible catheter 1000 to target location 1006 to puncture wall 1004 at target location 1004. The tissue puncturer may be prepositioned in flexible catheter 1000 such that advancing only involves a relatively short movement through the opening 1002.

Consistent with some disclosed embodiments, the tissue puncturer includes a needle. A needle refers to a slender, pointed, or cylindrical device whether or not pointed. Examples of needles include a round-bodied needle, tapered needle, cutting needle, reverse cutting needle, taper-cut needle, spatula needle, or blunt tipped needle. For example, FIG. 1 shows a tissue puncturer 118 shaped as a round-bodied needle. In some embodiments, the tissue puncturer may include a hollow tube. In some embodiments, the tissue puncturer may have a diameter less than 20 mm, 10 mm, or 7 mm. In some embodiments, the tissue puncturer may include a sharp blade.

Consistent with some disclosed embodiments, the method includes dilating an opening in the wall of the anatomical vessel caused by the tissue puncturer. Dilating an opening in the wall of the anatomical vessel caused by the tissue puncturer refers to enlarging or widening a hole, perforation, or incision caused by the tissue puncturer. Examples of dilating an opening in the wall of the anatomical vessel caused by the tissue puncturer include widening or enlarging a Seldinger dilator, valvulotome, balloon, expanding stent, and/or any other structure capable of widening a hole in tissue. FIG. 5 shows an example of dilating an opening in the vessel wall 506 caused by tissue puncturer 502. In this example, balloon dilator 504 may be integrated into any part of the intraluminal puncturing system 500, such as a distal tip of the elongated shaft or the second catheter. Once tissue puncturer 502 causes an opening in vessel wall 506 by cutting into vessel wall 506, balloon dilator 504 may be inflated, such as by activating an integrated inflation port allowing for inflation with a syringe or injecting a sterile saline solution or contrast dye through the elongated shaft and into the balloon. As balloon dilator 504 expands, it expands radially, pressing against the opening in vessel wall 506, further widening the opening.

Consistent with some disclosed embodiments, dilating includes advancing a dilator over the tissue puncturer. A dilator may be understood as described and exemplified earlier. For example, FIG. 3 shows a dilator 306 in the form of an inflatable balloon. Advancing a dilator over the tissue puncturer refers to introducing or delivering the dilator around or outside of the tissue puncturer. Examples of the advancing a dilator over the tissue puncturer include a dilator introduced over the tissue puncturer, and a tissue puncturer designed with a dilator which moves up and down the exterior of the tissue puncturer. For example, in FIG. 3, dilator 306 may be an inflatable balloon, which is advanced over elongated shaft 302. In this example, dilator 306 may be advanced over tissue puncturer 304.

Consistent with some disclosed embodiments, the method includes positioning the tissue puncturer near the target location by expanding a plurality of expandable arms on a distal end of a first catheter. A plurality of expandable arms refers to two or more structures configured to extend beyond a current state. Examples of a plurality of expandable arms include bendable, malleable, pliable, or otherwise yielding rods, wings, stents, articulations, or any other structures mentioned herein. For example, expanding a plurality of expandable arms on a distal end of a first catheter may refer to transitioning between the collapsed orientation in FIG. 2 and an expanded configuration on FIG. 4 wherein a flexible positioning arm 412 (and optionally a first flexible support arm 402, and a second flexible support arm 410), on a distal end of a first catheter 418. Positioning the tissue puncturer near the target location by expanding a plurality of expandable arms on a distal end of a first catheter refers to extending or enlarging the expandable arms to move or turn the tissue puncturer at or towards a proximity of the target location. Examples of positioning the tissue puncturer near the target location by expanding a plurality of expandable arms on a distal end of a first catheter include moving, rotating, or twisting the expandable arms near the target location. For example, FIG. 10B shows that expandable arms 1005 and 1010 may be expanded, such as by moving outwards from the central axis of the system once released from sheath 1012, to secure a position of the tissue puncturer 1008 near target location 1006. Further to expandable arm 1010, there may be multiple expandable arms engaging the vessel wall at multiple locations. The multiple locations of engagement with the vessel wall may refer to multiple locations longitudinally or circumferentially. For additional stability, multiple expandable arms may engage the wall longitudinally or circumferentially.

Consistent with some disclosed embodiments, the method includes sliding a sheath to radially expand the plurality of expandable arms such that at least one of the plurality of expandable arms contacts at least a portion of a wall of the anatomical vessel. A sheath may be understood as described and exemplified earlier. For example, FIG. 10 shows a sheath 1012 in the form of a tube. Sliding a sheath to radially expand the plurality of expandable arms such that at least one of the plurality of expandable arms contacts at least a portion of a wall of the anatomical vessel refers to moving or translating a sheath to expose primed arms which may be for example formed from shape memory material. By sliding a sheath, the arms extend outwards in a circular or radial direction away from the first catheter or a central axis thereof, to touch one or more sections of the wall. Examples of sliding a sheath include moving a sheath up or down the first catheter by manual control of the sheath or by an electronic controller configured to control motion of the sheath. For example, sheath 1012 may be slid from the position shown in FIG. 10A to the position shown in FIG. 10B by pulling sheath 1012 downwards and away from first catheter 1014. In this example, expandable arms 1010 and 1005 are no longer restricted by the surrounding presence of sheath 1012, as shown in FIG. 10B. Accordingly, expandable arms 1005 and 1010 shown in FIG. 10B expand radially outward to touch opposite portions of a wall 1004 of the anatomical vessel.

Consistent with some disclosed embodiments, a method includes sliding the sheath to radially collapse the plurality of expandable arms within the sheath. Sliding the sheath to radially collapse the plurality of expandable arms within the sheath refers to relative axial sliding movement between the arms and the sheath so that the arms become compressed radially within the sheath, or moving the sheath to inwardly or radially reduce a maximum distance, width, or span from a central axis of the expandable arms. Examples of sliding the sheath to radially collapse the plurality of expandable arms within the sheath include pushing the arms towards the first catheter or pushing the arms towards each other by the pressure of the sheath surrounding the arms. For example, the expandable arms 1005 and 1010 in FIG. 10B may radially collapse into the configuration shown in FIG. 10A by sliding sheath 1012 distally towards expandable arms 1005 and 1010. In this example, sliding sheath 1012 distally pushes expandable arms 1005 and 1010 closer together to radially collapse.

Consistent with some disclosed embodiments, forming a puncture at the target location includes forming a hole in a wall between a coronary sinus and a left atrium. Forming a hole in a wall between a coronary sinus and a left atrium includes cutting into or creating an incision in the wall to produce an opening, perforation, or orifice in the wall. Examples of forming a hole in a wall between a coronary sinus and a left atrium include ablating tissue in the wall or cutting into the wall. For example, in FIG. 8B, tissue puncturer may form a hole in a wall 808 between a coronary sinus and a left atrium by cutting a hole into wall 808. The hole may extend through both the coronary sinus and the left atrium.

Consistent with some disclosed embodiments, the tissue puncturer includes a hollow structure. A hollow structure refers to an object or component which has an empty space or void within its interior. Examples of a hollow structure include a tube, hollow needle, or perforated cylinder. For example, FIG. 1 shows an example of a tissue puncturer 118, which may be shaped as a needle with an empty space within its interior. The hollow space may be sized to permit a guidewire to pass therethrough. In this way, when the needle is withdrawn, the guidewire may remain in place and be used to deliver other structures over the wire.

Consistent with some disclosed embodiments, the tissue puncturer includes a non-hollow structure. A non-hollow structure refers to an object or component which does not contain an interior void or empty space. Examples of a non-hollow structure include a flat sheet, blade, non-hollow needle, or pin. For example, FIG. 5 shows an example of a tissue puncturer 502, which may be shaped as a blade with no empty space within its interior.

Consistent with some disclosed embodiments, a method includes retracting the flexible catheter to move the distal end of the first one of the plurality of expandable arms away from the target penetration site. Retracting the flexible catheter to move the distal end of the first one of the plurality of expandable arms away from the target penetration site refers to withdrawing or pulling back the flexible catheter away from the target penetration site. Examples of retracting the flexible catheter include pulling the flexible catheter by manual control of the flexible catheter or by an electronic controller configured to control motion of the flexible catheter. For example, distal end of an expandable arm 818 in FIG. 8B may move away from the target penetration site by pulling catheter 812 away from wall 808, as shown in FIG. 8A.

Consistent with some disclosed embodiments, a method includes exchanging the puncturer with a guidewire through the dilator. Exchanging the puncturer may be understood as described and exemplified earlier for the replacement of the puncturer with a guidewire. For example, FIG. 7 shows a puncturer 702, which may be exchanged with a guidewire 706. Exchanging the puncturer with a guidewire through the dilator refers to removing the puncturer and inserting the guidewire within or inside the dilator. Examples of exchanging the puncturer with a guidewire through the dilator include a guidewire introduced inside the dilator, and a dilator designed with a guidewire configured to move up and down the interior of the dilator. For example, dilator 306 in FIG. 3 may include a cavity through which puncturer 304 may be withdrawn and a guidewire may be inserted.

Consistent with some disclosed embodiments, orientation markers are used to guide axial and rotational orientation of any part of the system or the system as a whole. Orientation markers being used to guide axial and rotational orientation of any part of the system or the system as a whole refers to visual or tactile cues, symbols, or indicators being used to determine the position or alignment of a part or the system. Examples of orientation markers include radiopaque bands, directional arrows, color coding, length markings, numerical gradations, raised or textured surfaces, or side holes or ports. For example, an orientation market may include a heavy metal, such as platinum or gold, configured to appear bright on medical imaging, such as X-rays or fluoroscopy, to help visualize a position or alignment of the flexible catheter within a body.

Also disclosed herein are following clauses.

Clause 1. An intraluminal puncturing system, comprising:
  a first catheter having a flexible positioning arm extending from a distal end thereof and being configured for delivery within an anatomical vessel, the flexible positioning arm being configured to transition between a collapsed orientation and an expanded orientation;
  a second catheter disposed within the first catheter and having an opened distal end affixed to the positioning arm such that when the flexible positioning arm is in the expanded orientation, the opened distal end opposes a wall of the anatomical vessel;
  an elongated shaft extendable through the second catheter; and a tissue puncturer located on a distal end of the elongated shaft, the tissue puncturer being configured for axial advancement in the second catheter and operably connected to the opened distal end of the second catheter.

Clause 2. The intraluminal puncturing system of the preceding clause, further comprising at least one flexible support arm movable from a collapsed orientation to an expanded orientation for cooperating with the flexible positioning arm to secure the distal end opening of the second catheter against the wall of the vessel.

Clause 3. The intraluminal puncturing system of any of the preceding clauses, further comprising at least two flexible support arms for cooperating with the flexible positioning arm to secure the opened distal end of the second catheter against the wall of the vessel.

Clause 4. The intraluminal puncturing system of any of the preceding clauses, wherein the flexible positioning arm includes an orifice therein and wherein the opened distal end of the second catheter is connected to the orifice.

Clause 5. The intraluminal puncturing system of any of the preceding clauses, further comprising a sheath in which the first catheter is located and configured for relative axial movement relative to the first catheter, for holding the flexible positioning arm in the collapsed orientation, and for permitting the flexible positioning arm to transition to the expanded orientation when the flexible positioning arm exits the sheath.

Clause 6. The intraluminal puncturing system of any of the preceding clauses, wherein the second catheter includes a proximal end extending out of the sheath and configured to enable control of the opened distal end.

Clause 7. The intraluminal puncturing system of any of the preceding clauses, wherein the elongated shaft includes a proximal end extending out of the second catheter and configured to enable control of the tissue puncturer.

Clause 8. The intraluminal puncturing system of any of the preceding clauses, wherein the tissue puncturer includes a sharp edge or sharp blade configured to pierce tissue.

Clause 9. The intraluminal puncturing system of any of the preceding clauses, wherein the flexible positioning arm and the least one flexible support arm are configured to collapse and expand radially relative to a central axis of the system.

Clause 10. The intraluminal puncturing system of any of the preceding clauses, further comprising at least one control for radial and axial manipulation of each of the elongated shaft, first catheter and the second catheter.

Clause 11. The intraluminal puncturing system of any of the preceding clauses, wherein the at least one control further includes a lock configured to prevent radial or axial manipulation of at least one of the elongated shaft, first catheter, and the second catheter.

Clause 12. The intraluminal puncturing system of any of the preceding clauses, further comprising a dilator configured to dilate an opening in the vessel wall caused by the tissue puncturer.

Clause 13. The intraluminal puncturing system of any of the preceding clauses, further comprising a hollow tube in the second catheter, the hollow tube being configured to act as a placeholder during replacement of the puncturer with a guidewire.

Clause 14. The intraluminal puncturing system of any of the preceding clauses, wherein the dilator is configured for delivery over the elongated shaft.

Clause 15. The intraluminal puncturing system of any of the preceding clauses, wherein the at least one flexible support arm and the flexible positioning arm cooperate in their respective expanded orientations to each engage the wall at differing locations.

Clause 16. The intraluminal puncturing system of any of the preceding clauses, wherein an angle of the opened distal end is adjustable between 0 and 180 degrees relative to a central axis of the system to permit tissue puncturing at selected angles between 0 and 150 degrees.

Clause 17. The intraluminal puncturing system of any of the preceding clauses, wherein the opened distal end is adjustable between 0 and 180 degrees relative to an elongated axis of the system by axial movement of the second catheter relative to the first catheter.

Clause 18. The intraluminal puncturing system of any of the preceding clauses, wherein the second catheter is configured to bend towards the wall to enable the tissue puncturer to puncture the wall orthogonally.

Clause 19. The intraluminal puncturing system of any of the preceding clauses, wherein the at least one flexible support arm is configured to be positioned relative to the wall to enable the tissue puncturer to puncture the wall orthogonally.

Clause 20. A method for puncturing a wall of an anatomical vessel, alone or in combination with any of the preceding clauses, the method comprising:
advancing a flexible catheter having an opened distal end in the anatomical vessel;
manipulating the opened distal end so that the opened distal end opposes a target location on the wall of the anatomical vessel;
bracing the opened distal end within the vessel to restrict movement of the opened distal end; and
advancing a tissue puncturer through the flexible catheter to puncture the wall of the anatomical vessel at the target location.

Clause 21. The method of the preceding clause, wherein manipulating the opened distal end includes bending a flexible positioning arm to which the distal open end is connected.

Clause 22. The method of any of the preceding clauses, wherein bracing includes causing a plurality of flexible braces to expand against differing locations on the vessel wall.

Clause 23. The method of any of the preceding clauses, wherein the tissue puncturer includes a needle.

Clause 24. The method of any of the preceding clauses, further comprising dilating an opening in the wall of the anatomical vessel caused by the tissue puncturer.

Clause 25. The method of any of the preceding clauses, wherein dilating includes advancing a dilator over the tissue puncturer.

Clause 26. The method of any of the preceding clauses, wherein the method further comprises positioning the tissue puncturer near the target location by expanding a plurality of expandable arms on a distal end of a first catheter.

Clause 27. The method of any of the preceding clauses, wherein the method further comprises sliding a sheath to radially expand the plurality of expandable arms such that at least one of the plurality of expandable arms contacts at least a portion of a wall of the anatomical vessel.

Clause 28. The method of any of the preceding clauses, wherein the method further comprises sliding the sheath to radially collapse the plurality of expandable arms within the sheath.

Clause 29. The method of any of the preceding clauses, wherein the anatomical vessel includes a coronary sinus.

Clause 30. The method of any of the preceding clauses, wherein forming a puncture at the target location includes forming a hole in a wall between a coronary sinus and a left atrium.

Clause 31. The method of any of the preceding clauses, wherein the tissue puncturer includes a hollow structure.

Clause 32. The method of any of the preceding clauses, wherein the tissue puncturer includes a non-hollow structure.

Clause 33. The method of any of the preceding clauses, wherein the method further comprises retracting the flexible catheter to move the distal end of the first one of the plurality of expandable arms away from the target penetration site.

Clause 34. The method of any of the preceding clauses, wherein manipulating includes axial or radial manipulation of the flexible catheter.

Clause 35. The method of any of the preceding clauses, wherein manipulating includes adjusting an angle of the opened distal end.

Clause 36. The method of any of the preceding clauses, wherein manipulating includes adjusting an angle of the flexible positioning arm.

Clause 37. The method of any of the preceding clauses, wherein manipulating includes adjusting a distance of the opened distal end from the wall.

Clause 38. The method of any of the preceding clauses, wherein manipulating includes adjusting a distance of the flexible positioning arm from the wall.

Clause 39. The method of any of the preceding clauses, further comprising exchanging the puncturer with a guidewire through the dilator.

Clause 40. The method of any of the preceding clauses, wherein orientation markers are used to guide axial and rotational orientation of any part of the system or the system as a whole.

Clause 41. An intraluminal puncturing system alone or in combination with any of any of the preceding clauses, comprising:
  a first catheter having a flexible positioning arm extending from a distal end thereof and being configured for delivery within an anatomical vessel, the flexible positioning arm being configured to transition between a collapsed orientation and an expanded orientation;
  a second catheter disposed within the first catheter and having an opened distal end affixed to the positioning arm such that when the flexible positioning arm is in the expanded orientation, the opened distal end opposes a wall of the anatomical vessel;
  an elongated shaft extendable through the second catheter; and
  a tool located on a distal end of the elongated shaft, the tool being configured for axial advancement in the second catheter and operably connected to the opened distal end of the second catheter.

Clause 42. The system of any of the preceding clauses, wherein the tool includes a balloon.

Clause 43. The system of any of the preceding clauses, wherein the tool includes an ablation device.

Clause 44. The system of any of the preceding clauses, wherein the tool includes an endoscope.

Clause 45. The system of any of the preceding clauses, wherein the tool includes a basket.

Clause 46. The system of any of the preceding clauses, wherein the tool includes a snare.

Clause 47. The system of any of the preceding clauses, wherein the tool includes a grasper.

Clause 48. The system of any of the preceding clauses, wherein the tool includes forceps.

Disclosed embodiments may include any one of the following bullet-pointed features alone or in combination with one or more other bullet-pointed features, whether implemented as a system, device, and/or method.
  an intraluminal puncturing system
  a first catheter having a flexible positioning arm extending from a distal end thereof
  the first catheter being configured for delivery within an anatomical vessel
  the flexible positioning arm being configured to transition between a collapsed orientation and an expanded orientation
  a second catheter disposed within the first catheter
  the second catheter having an opened distal end affixed to the positioning arm
  when the flexible positioning arm is in the expanded orientation, the opened distal end opposes a wall of the anatomical vessel
  an elongated shaft extendable through the second catheter
  a tissue puncturer located on a distal end of the elongated shaft
  a tissue puncturer being configured for axial advancement in the second catheter
  a tissue puncturer being operably connected to the opened distal end of the second catheter
  a tool located on a distal end of the elongated shaft
  the tool being configured for axial advancement in the second catheter
  the tool being operably connected to the opened distal end of the second catheter
  the tool includes a balloon
  the tool includes an ablation device
  the tool includes an endoscope
  the tool includes a basket
  the tool includes a snare
  the tool includes a grasper
  the tool includes forceps
  at least one flexible support arm
  the at least one flexible support arm being movable from a collapsed orientation to an expanded orientation
  for cooperating with the flexible positioning arm
  to secure the distal end opening of the second catheter against the wall of the vessel
  at least two flexible support arms
  the at least two flexible support arms for cooperating with the flexible positioning arm
  to secure the opened distal end of the second catheter against the wall of the vessel
  the flexible positioning arm includes an orifice therein
  the opened distal end of the second catheter is connected to the orifice
  a sheath in which the first catheter is located
  the sheath being configured for relative axial movement relative to the first catheter
  the sheath being configured for holding the flexible positioning arm in the collapsed orientation
  the sheath being configured for permitting the flexible positioning arm to transition to the expanded orientation when the flexible positioning arm exits the sheath
  the second catheter includes a proximal end extending out of the sheath
  the proximal end being configured to enable control of the opened distal end
  the elongated shaft includes a proximal end extending out of the second catheter the proximal end being configured to enable control of the tissue puncturer the tissue puncturer includes a sharp edge or sharp blade configured to pierce tissue the flexible positioning arm and the least one flexible support arm are configured to collapse and expand radially relative to a central axis of the system at least one control for radial and axial manipulation of each of the elongated shaft, first catheter and the second catheter the at least one control further includes a lock the lock being configured to prevent radial or axial manipulation of at least one of the elongated shaft, first catheter, and the second catheter a dilator configured to dilate an opening in the vessel wall caused by the tissue puncture a hollow tube in the second catheter the hollow tube being configured to act as a placeholder during replacement of the puncturer with a guidewire the dilator is configured for delivery over the elongated shaft the at least one flexible support arm and the flexible positioning arm cooperate in their respective expanded orientations to each engage the wall at differing locations an angle of the opened distal end is adjustable between 0 and 180 degrees relative to a central axis of the system to permit tissue puncturing at selected angles between 0 and 150 degrees the opened distal end is adjustable between 0 and 180 degrees relative to an elongated axis of the system by axial movement of the second catheter relative to the first catheter the second catheter is configured to bend towards the wall to enable the tissue puncturer to puncture the wall orthogonally the at least one flexible support arm is configured to be positioned relative to the wall to enable the tissue puncturer to puncture the wall orthogonally a method for puncturing a wall of an anatomical vessel advancing a flexible catheter having an opened distal end in the anatomical vessel manipulating the opened distal end so that the opened distal end opposes a target location on the wall of the anatomical vessel bracing the opened distal end within the vessel to restrict movement of the opened distal end advancing a tissue puncturer through the flexible catheter to puncture the wall of the anatomical vessel at the target location manipulating the opened distal end includes bending a flexible positioning arm to which the distal open end is connected bracing includes causing a plurality of flexible braces to expand against differing locations on the vessel wall the tissue puncturer includes a needle dilating an opening in the wall of the anatomical vessel caused by the tissue puncture dilating includes advancing a dilator over the tissue puncture positioning the tissue puncturer near the target location by expanding a plurality of expandable arms on a distal end of a first catheter sliding a sheath to radially expand the plurality of expandable arms such that at least one of the plurality of expandable arms contacts at least a portion of a wall of the anatomical vessel sliding the sheath to radially collapse the plurality of expandable arms within the sheath the anatomical vessel includes a coronary sinus forming a puncture at the target location includes forming a hole in a wall between a coronary sinus and a left atrium the tissue puncturer includes a hollow structure the tissue puncturer includes a non-hollow structure retracting the flexible catheter to move the distal end of the first one of the plurality of expandable arms away from the target penetration site manipulating includes axial or radial manipulation of the flexible catheter manipulating includes adjusting an angle of the opened distal end manipulating includes adjusting an angle of the flexible positioning arm manipulating includes adjusting a distance of the opened distal end from the wall manipulating includes adjusting a distance of the flexible positioning arm from the wall exchanging the puncturer with a guidewire through the dilator orientation markers are used to guide axial and rotational orientation of any part of the system or the system as a whole Other embodiments will be apparent from consideration of the specification and practice of the embodiments disclosed herein. It is intended that the specification and examples be considered as example only, with a true scope and spirit of the disclosed embodiments being indicated by the following claims.

What is claimed is:

1. An intraluminal puncturing system, comprising:
a first catheter having a flexible positioning arm extending from a distal end thereof and being configured for delivery within an anatomical vessel, the flexible positioning arm being configured to transition between a collapsed orientation and an expanded orientation;
a second catheter disposed within the first catheter and having an opened distal end affixed to the positioning arm such that when the flexible positioning arm is in the expanded orientation, the opened distal end opposes a wall of the anatomical vessel;
an elongated shaft extendable through the second catheter; and
a tissue puncturer located on a distal end of the elongated shaft, the tissue puncturer being configured for axial advancement in the second catheter and operably connected to the opened distal end of the second catheter.

2. The intraluminal puncturing system of claim 1, further comprising at least one flexible support arm movable from a collapsed orientation to an expanded orientation for cooperating with the flexible positioning arm to secure the distal end opening of the second catheter against the wall of the vessel.

3. The intraluminal puncturing system of claim 2, wherein the flexible positioning arm and the least one flexible support arm are configured to collapse and expand radially relative to a central axis of the system.

4. The intraluminal puncturing system of claim 2, wherein the at least one flexible support arm and the flexible positioning arm cooperate in their respective expanded orientations to each engage the wall at differing locations.

5. The intraluminal puncturing system of claim 2, wherein the at least one flexible support arm is configured to be positioned relative to the wall to enable the tissue puncturer to puncture the wall orthogonally.

6. The intraluminal puncturing system of claim 1, further comprising at least two flexible support arms for cooperating with the flexible positioning arm to secure the opened distal end of the second catheter against the wall of the vessel.

7. The intraluminal puncturing system of claim 1, wherein the flexible positioning arm includes an orifice therein and wherein the opened distal end of the second catheter is connected to the orifice.

8. The intraluminal puncturing system of claim 1, further comprising a sheath in which the first catheter is located and configured for relative axial movement relative to the first catheter, for holding the flexible positioning arm in the collapsed orientation, and for permitting the flexible positioning arm to transition to the expanded orientation when the flexible positioning arm exits the sheath.

9. The intraluminal puncturing system of claim 8, wherein the second catheter includes a proximal end extending out of the sheath and configured to enable control of the opened distal end.

10. The intraluminal puncturing system of claim 1, wherein the elongated shaft includes a proximal end extending out of the second catheter and configured to enable control of the tissue puncturer.

11. The intraluminal puncturing system of claim 1, wherein the tissue puncturer includes a sharp edge or sharp blade configured to pierce tissue.

12. The intraluminal puncturing system of claim 1, further comprising at least one control for radial and axial manipulation of each of the elongated shaft, first catheter and the second catheter.

13. The intraluminal puncturing system of claim 12, wherein the at least one control further includes a lock configured to prevent radial or axial manipulation of at least one of the elongated shaft, first catheter, and the second catheter.

14. The intraluminal puncturing system of claim 1, further comprising a dilator configured to dilate an opening in the vessel wall caused by the tissue puncturer.

15. The intraluminal puncturing system of claim 14, wherein the dilator is configured for delivery over the elongated shaft.

16. The intraluminal puncturing system of claim 1, further comprising a hollow tube in the second catheter, the hollow tube being configured to act as a placeholder during replacement of the puncturer with a guidewire.

17. The intraluminal puncturing system of claim 1, wherein an angle of the opened distal end is adjustable between 0 and 180 degrees relative to a central axis of the system to permit tissue puncturing at selected angles between 0 and 150 degrees.

18. The intraluminal puncturing system of claim 1, wherein the opened distal end is adjustable between 0 and 180 degrees relative to an elongated axis of the system by axial movement of the second catheter relative to the first catheter.

19. The intraluminal puncturing system of claim 1, wherein the distal end of the second catheter is configured to bend towards the wall upon axial manipulation to enable the tissue puncturer to puncture the wall orthogonally.

* * * * *